(12) United States Patent
Wang et al.

(10) Patent No.: US 12,459,808 B2
(45) Date of Patent: Nov. 4, 2025

(54) SENSOR

(71) Applicant: KABUSHIKI KAISHA TOSHIBA, Tokyo (JP)

(72) Inventors: Ping Wang, Fujisawa Kanagawa (JP); Hiroaki Yamazaki, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 592 days.

(21) Appl. No.: 17/823,629

(22) Filed: Aug. 31, 2022

(65) Prior Publication Data

US 2023/0077493 A1 Mar. 16, 2023

(30) Foreign Application Priority Data

Sep. 13, 2021 (JP) .................................. 2021-148354
Jun. 14, 2022 (JP) .................................. 2022-095735

(51) Int. Cl.
*B81B 3/00* (2006.01)

(52) U.S. Cl.
CPC .... *B81B 3/0078* (2013.01); *B81B 2201/0264* (2013.01); *B81B 2207/095* (2013.01)

(58) Field of Classification Search
CPC .......... B81B 3/0078; B81B 2201/0264; B81B 2207/095; G01N 25/18; G01F 23/22
See application file for complete search history.

(56) References Cited

U.S. PATENT DOCUMENTS

2006/0105964 A1 5/2006 Ramanathan et al.
2011/0015572 A1 1/2011 Thorley et al.
(Continued)

FOREIGN PATENT DOCUMENTS

JP 2010-531679 A 9/2010
JP 2012-72195 A 4/2012
(Continued)

OTHER PUBLICATIONS

Yumi Hayashi, "Integrated Hybrid MEMS Hydrogen Sensor with High Sensitivity and High Dynamic Range," IEEJ Trans. on Sensors and Micromachines, vol. 140, No. 7, pp. 158-164 (2020).
(Continued)

*Primary Examiner* — Moazzam Hossain
(74) *Attorney, Agent, or Firm* — Finnegan, Henderson, Farabow, Garrett & Dunner, LLP

(57) ABSTRACT

According to one embodiment, a sensor includes a base, first and second detection units. The base includes first and second base regions. The first detection unit includes a first detection element including a first resistance member, a first conductive member, and a first insulating member. A part of the first insulating member is between the first resistance member and the first conductive member. A first gap is provided between the first base region and first detection element. The first detection element has a first area. The second detection unit includes a second detection element including a second resistance member, a second conductive member, and a second insulating member. A part of the second insulating member is between the second resistance member and the second conductive member. A second gap is provided between the second base region and second detection element. The second detection element has a second area.

17 Claims, 24 Drawing Sheets

(56) References Cited

U.S. PATENT DOCUMENTS

| | | |
|---|---|---|
| 2013/0259084 A1 | 10/2013 | Ooishi |
| 2017/0343502 A1 | 11/2017 | Wang et al. |
| 2019/0086377 A1* | 3/2019 | Ikehashi ............... G01N 27/221 |
| 2019/0353607 A1* | 11/2019 | Kaita ................... G01N 27/028 |
| 2020/0080954 A1* | 3/2020 | Yamazaki ............ G01N 27/123 |
| 2020/0131024 A1* | 4/2020 | Jiang .................... H04R 19/005 |
| 2021/0160439 A1* | 5/2021 | Hosaka ................. H04N 23/23 |

FOREIGN PATENT DOCUMENTS

| | | |
|---|---|---|
| JP | 2012-72277 A | 4/2012 |
| JP | 2013-205105 A | 10/2013 |
| JP | 5781968 B2 | 9/2015 |
| JP | 2016-22585 A | 2/2016 |

OTHER PUBLICATIONS

Japan Patent Office, Office Action in JP App. No. 2022-095735 (Jul. 8, 2025).

* cited by examiner

SENSOR

CROSS-REFERENCE TO RELATED APPLICATIONS

This application is based upon and claims the benefit of priority from Japanese Patent Application No. 2021-148354, filed on Sep. 13, 2021, and Japanese Patent Application No. 2022-095735, filed on Jun. 14, 2022; the entire contents of which are incorporated herein by reference.

FIELD

Embodiments described herein relate generally to a sensor.

BACKGROUND

For example, there is a sensor using a MEMS (Micro Electro Mechanical Systems) element or the like. It is desired to improve the characteristics of the sensor.

DETAILED DESCRIPTION

Figure 1:
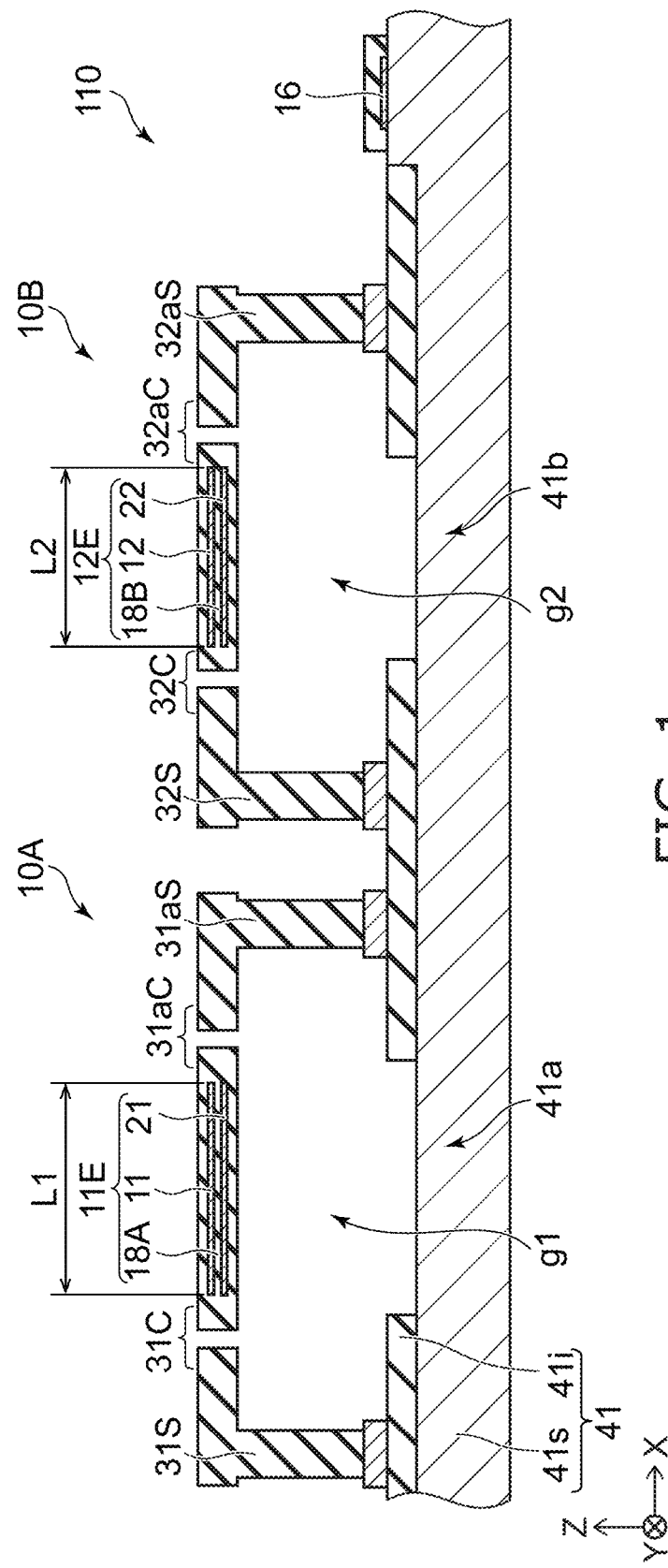
FIG. 1 is a schematic diagram illustrating a sensor according to a first embodiment.

According to one embodiment, a sensor includes a base, a first detection unit, and a second detection unit. The base includes a first base region and a second base region. The first detection unit includes a first detection element. The first detection element includes a first resistance member, a first conductive member, and a first insulating member. At least a part of the first insulating member is between the first resistance member and the first conductive member. A first gap is provided between the first base region and the first detection element. The first detection element has a first area in a plane crossing a first direction from the first base region to the first detection element. The second detection unit includes a second detection element. The second detection element includes a second resistance member, a second conductive member, and a second insulating member. At least a part of the second insulating member is between the second resistance member and the second conductive member. A second gap is provided between the second base region and the second detection element. The second detection element has a second area in the plane. The second area is smaller than the first area.

According to one embodiment, a sensor includes a base, a first detection unit, and a second detection unit. The base includes a first base region and a second base region. The first detection unit includes a first detection element, a first support portion, and a first connect portion. The first support portion is fixed to the base. The first connect portion is supported by the first support portion and supports the first detection element. A gap is provided between the first base region and the first connect portion. The first detection element includes a first resistance member and a first conductive member. The second detection unit includes a second detection element, a second support portion, and a second connect portion. The second support portion is fixed to the base. The second connect portion is supported by the second support portion and supports the second detection element. A gap is provided between the second base region and the second connect portion. The second detection element includes a second resistance member and a second conductive member. The first connect portion includes a first connect portion length, a first connect portion width, a first connect portion thickness, and a first connect portion material. The first connect portion length is a length of the first connect portion along a first connect portion path between the first support portion and the first detection element. The first connect portion width is a width of the first connect portion in a direction crossing the first connect portion path. The first connect portion thickness is a thickness of the first connect portion in the first direction. The second connect portion includes at least one of a second connect portion length different from the first connect portion length, a second connect portion width different from the first connect portion width, a second connect portion thickness different from the first connect portion thickness, or a second connect portion material different from the first connect portion material. The second connect portion length is a length of the second connect portion along a second connect portion path between the second support portion and the second detection element. The second connect portion width is a width of the second connect portion in a direction crossing the second connect portion path. The second connect portion thickness is a thickness of the second connect portion in the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 2:
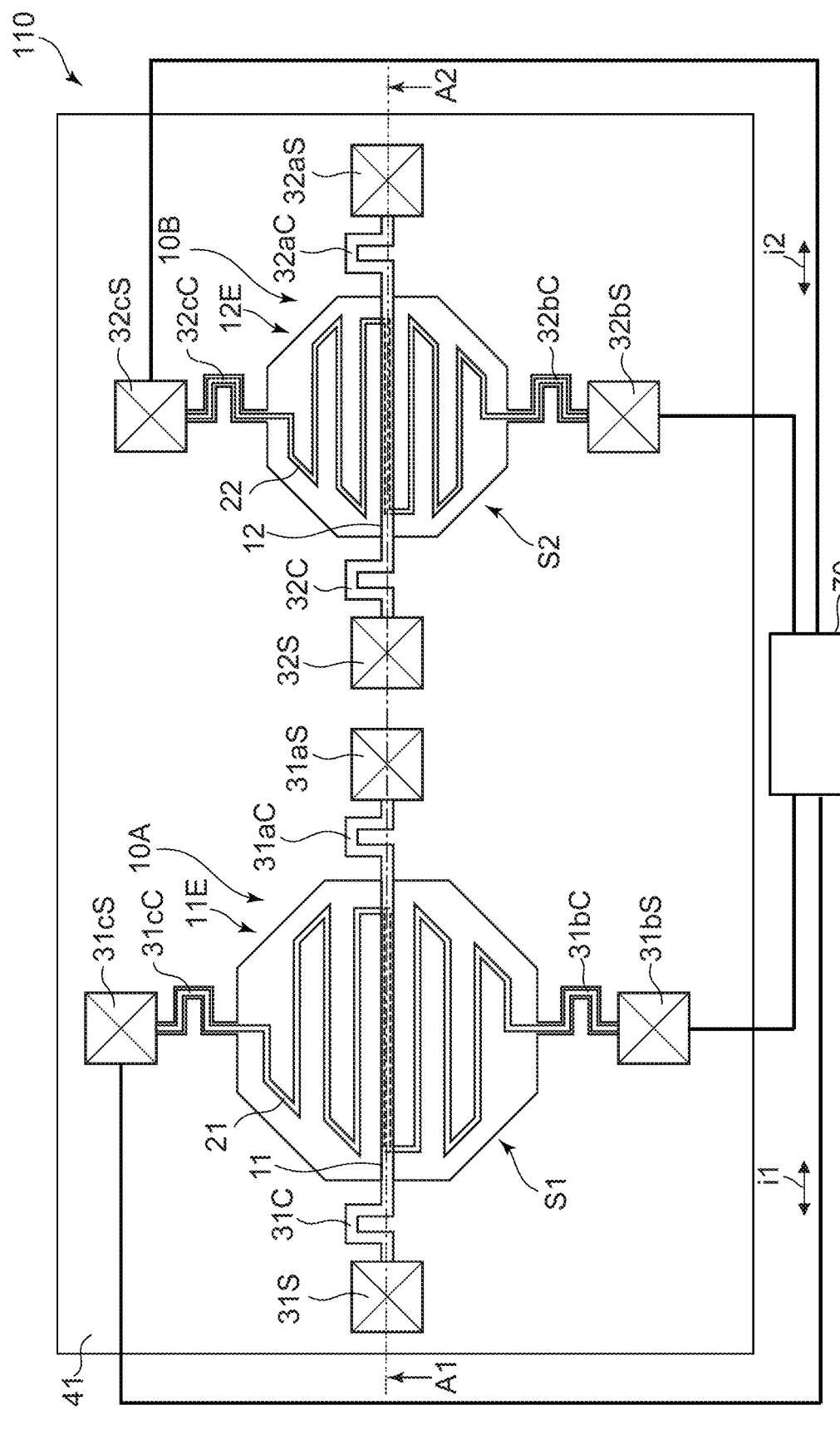
FIG. 2 is a schematic diagram illustrating the sensor according to the first embodiment.
Figure 3:
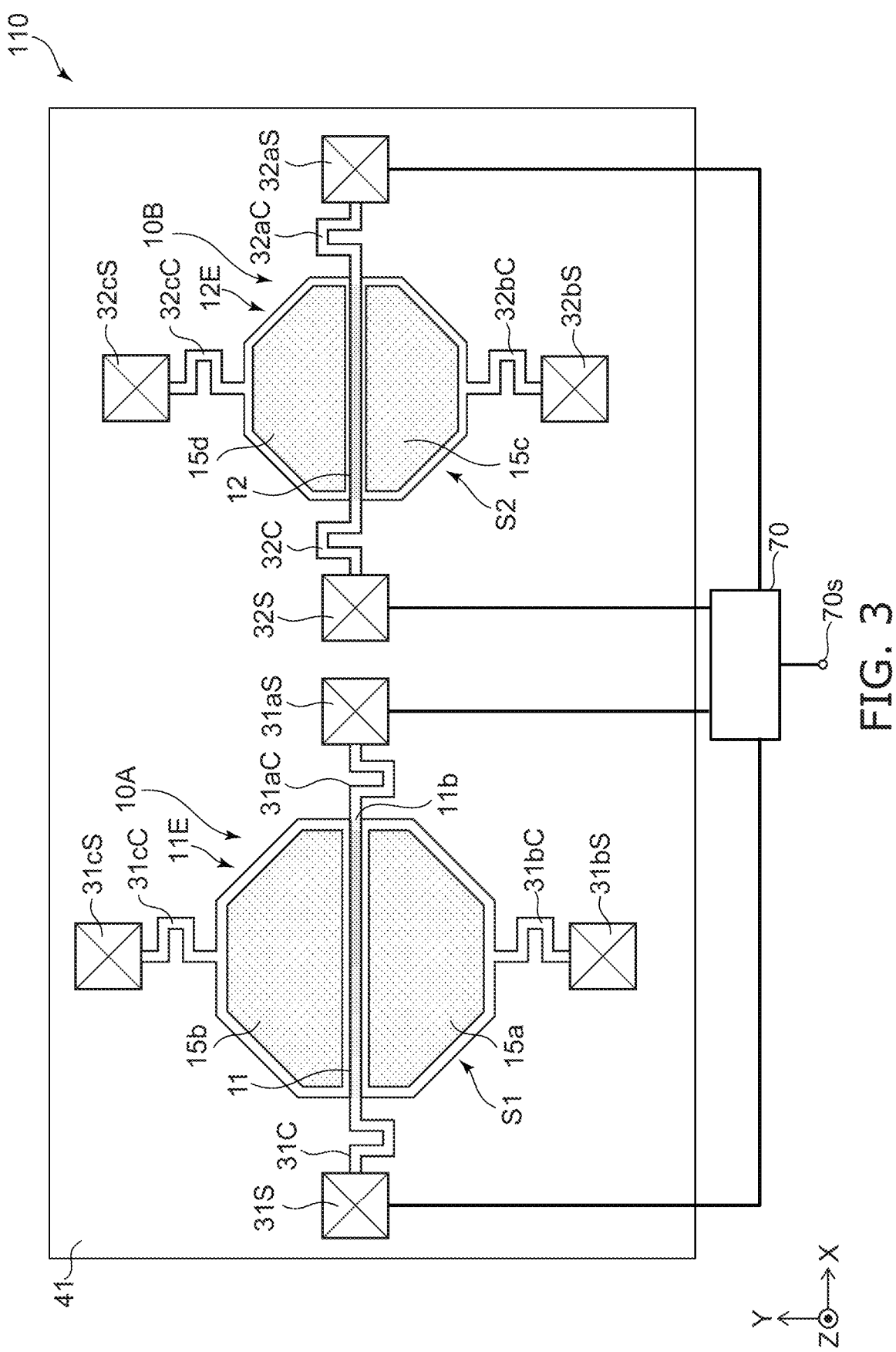
FIG. 3 is a schematic diagram illustrating the sensor according to the first embodiment.

FIGS. 1 to 3 are schematic views illustrating a sensor according to the first embodiment.

FIG. 1 is a cross-sectional view taken along the line A1-A2 of FIG. 2. FIGS. 2 and 3 are plan views. As shown in FIGS. 1 to 3, a sensor 110 according to the embodiment includes a base 41, a first detection unit 10A, and a second detection unit 10B.

As shown in FIG. 1, the base 41 includes a first base region 41a and a second base region 41b. In this example, the base 41 includes a substrate 41s and an insulating film 41i. The substrate 41s may be, for example, a semiconductor substrate (for example, a silicon substrate). The substrate 41s may include, for example, a semiconductor circuit or the like. The substrate 41s may include a connecting member such as a via electrode.

A direction from the first base region 41a to the second base region 41b is, for example, along an upper face of the base 41.

As shown in FIG. 1, the first detection unit 10A includes a first detection element 11E. The first detection element 11E includes a first resistance member 11, a first conductive member 21, and a first insulating member 18A. At least a part of the first insulating member 18A is between the first resistance member 11 and the first conductive member 21. In this example, the first insulating member 18A is around the first resistance member 11. The first insulating member 18A is around the first conductive member 21. In this example, the first conductive member 21 is between the base 41 and the first resistance member 11. In the embodiment, the first resistance member 11 may be located between the base 41 and the first conductive member 21. A first gap g1 is provided between the first base region 41a and the first detection element 11E.

FIG. 2 illustrates a planar pattern of the first conductive member 21 and the second conductive member 22. FIG. 3 illustrates a planar pattern of the first resistance member 11 and the second resistance member 12.

As shown in FIGS. 2 and 3, in this example, the first detection element 11E (a portion including the first resistance member 11, the first conductive member 21, and the first insulating member 18A) has an octagonal shape. The planar shape of the first detection element 11E is arbitrary. The first detection element 11E has a first area S1. The first area S1 is the area of the first detection element 11E in a plane crossing a first direction from the first base region 41a to the first detection element 11E.

As shown in FIG. 1, the first direction is a Z-axis direction. One direction perpendicular to the Z-axis direction is defined as an X-axis direction. The direction perpendicular to the Z-axis direction and the X-axis direction is defined as a Y-axis direction. The plane crossing the first direction is, for example, the X-Y plane.

As shown in FIG. 1, the second detection unit 10B includes the second detection element 12E. The second detection element 12E includes a second resistance member 12, a second conductive member 22, and a second insulating member 18B. At least a part of the second insulating member 18B is between the second resistance member 12 and the second conductive member 22. In this example, the second insulating member 18B is around the second resistance member 12. The second insulating member 18B is around the second conductive member 22. In this example, the second conductive member 22 is between the base 41 and the second resistance member 12. In the embodiment, the second resistance member 12 may be located between the base 41 and the second conductive member 22. A second gap g2 is provided between the second base region 41b and the second detection element 12E.

As shown in FIGS. 2 and 3, in this example, the second detection element 12E (the portion including the second resistance member 12, the second conductive member 22, and the second insulating member 18B) has an octagonal shape. The planar shape of the second detection element 12E is arbitrary. The second detection element 12E has a second area S2. The second area S2 is the area of the second detection element 12E in the above plane (plane crossing the first direction). The second area S2 is smaller than the first area S1.

As shown in FIGS. 2 and 3, a controller 70 may be provided. The controller 70 can be electrically connected with the first resistance member 11, the first conductive member 21, the second resistance member 12, and the second conductive member 22. For example, the controller 70 supplies a first current i1 to the first conductive member 21 to raise the temperature of the first detection element 11E. The controller 70 supplies a second current i2 to the second conductive member 22 to raise the temperature of the second detection element 12E.

The temperature of these detection elements rises due to Joule heat due to the supplied current. The amount of heat of these detection elements changes through substances (gas, etc.) included in a space around these detection elements. The degree of change in the amount of heat depends on the thermal conductivity of the substance included in the surrounding space. The temperature of these detection elements is detected by the resistance member. By detecting the temperature of these detection elements, the presence/absence and concentration of substances included in the surrounding space can be detected. A detection signal 70s including a detection result is output from the controller 70.

In the embodiment, the area is different between the first detection element 11E and the second detection element 12E. Due to the difference in area, the characteristics of changes in the amount of heat (for example, heat dissipation characteristics) in these detection elements differ. Due to the difference in area, the characteristics of temperature changes of these detection elements are different from each other. By utilizing the difference in the characteristics of temperature changes, for example, it is possible to detect a substance to be detected with higher accuracy. According to the embodiment, it is possible to provide a sensor whose characteristics can be improved.

For example, the space around these detection elements may include multiple substances of different types. For example, the space may include carbon monoxide, carbon dioxide (for example, first substance), and hydrogen (for example, second substance). In a first reference example using one detection element, the temperature of the detection element is affected by both the influence of the thermal conductivity of a plurality of different kinds of substances and the concentration of those substances. Therefore, in the first reference example, it is difficult to detect a plurality of different types of substances (first substance, second substance, etc.).

In a second reference example, one detection element is used, the detection element is heated to a plurality of temperatures, and a method of detecting the temperature (degree of heat dissipation) of the detection element at a plurality of temperatures can be considered. In the second reference example, when a plurality of types of substances are detected using the measurement results of a plurality of temperatures of the detection element, the detection accuracy is not sufficient. In the second reference example, since only one detection element is used and there is only one type of heat dissipation characteristic, the accuracy is insufficient. Further, in the second reference example, the measurement time is long because the temperature needs to be raised a plurality of times. In the second reference example, the control circuit is complicated.

In the embodiment, a plurality of detection elements having different heat dissipation characteristics are used. By utilizing the characteristics of temperature changes of detection elements having different heat dissipation characteristics, it is possible to separate the influence of the thermal conductivity of a plurality of different types of substances and the concentration of those substances. For example, for each of the plurality of detection elements, information on the relationship between the respective concentrations of the plurality of substances of different types and the temperature (or the value corresponding to the temperature) is acquired in advance. By using this information and the measured value (plurality of values) of the temperature (or the value corresponding to the temperature) obtained from these detection elements, the concentration of each of a plurality of different types of substances can be detected with high accuracy. For example, by solving simultaneous equations, it is possible to detect the concentration of each of a plurality of different types of substances with high accuracy. In the embodiment, since the measurement is performed by a plurality of detection elements, the measurement time is short.

An example of the processing method in detection in the embodiment, will be described later.

As described above, in the embodiment, the second area S2 of the second detection element 12E is smaller than the first area S1 of the first detection element 11E. In the embodiment, the relationship between these areas may be reversed.

As shown in FIG. 1, the first detection element 11E has a first length L1 in a direction (for example, a second direction) crossing the first direction (Z-axis direction). The second direction is one direction along the X-Y plane. The second direction may be, for example, the X-axis direction. The second detection element 12E has a second length L2 in the direction (for example, the second direction) crossing the first direction (Z-axis direction). In this example, the second length L2 is shorter than the first length L1. The difference in area is obtained.

As shown in FIGS. 1 to 3, for example, the first detection unit 10A may further include a first support portion 31S and a first connect portion 31C. The first support portion 31S is fixed to the base 41. The first connect portion 31C is supported by the first support portion 31S and supports the first detection element 11E. A gap is provided between the first base region 41a and the first connect portion 31C. The first connect portion 31C has, for example, a spring structure. The first detection unit 10A may have a single beam structure.

The second detection unit 10B may further include a second support portion 32S and a second connect portion 32C. The second support portion 32S is fixed to the base 41. The second connect portion 32C is supported by the second support portion 32S and supports the second detection element 12E. A gap is provided between the second base region 41b and the second connect portion 32C. The second connect portion 32C has, for example, a spring structure. The second detection unit 10B may have a single beam structure.

As shown in FIGS. 1 to 3, for example, the first detection unit 10A may further include a first other support portion 31aS and a first other connect portion 31aC. The first other support portion 31aS is fixed to the base 41. The first other connect portion 31aC is supported by the first other support portion 31aS and supports the first detection element 11E. A gap is provided between the first base region 41a and the first other connect portion 31aC. In this example, the first detection element 11E is provided between the first connect portion 31C and the first other connect portion 31aC. The first detection unit 10A may have a double beam structure.

The second detection unit 10B may further include a second other support portion 32aS and a second other connect portion 32aC. The second other support portion 32aS is fixed to the base 41. The second other connect portion 32aC is supported by the second other support portion 32aS and supports the second detection element 12E. A gap is provided between the second base region 41b and the second other connect portion 32aC. In this example, the second detection element 12E is provided between the second connect portion 32C and the second other connect portion 32aC. The second detection unit 10B may have a double beam structure.

As shown in FIGS. 2 and 3, the first detection unit 10A may further include a support portion 31bS and a connect portion 31bC. The support portion 31bS is fixed to the base 41. The connect portion 31bC is supported by the support portion 31bS and supports the first detection element 11E. A gap (not shown) is provided between the first base region 41a and the connect portion 31bC. The connect portion 31bC has, for example, a spring structure.

The first detection unit 10A may further include a support portion 31cS and a connect portion 31cC. The support portion 31cS is fixed to the base 41. The connect portion 31cC is supported by the support portion 31cS and supports the first detection element 11E. A gap (not shown) is provided between the first base region 41a and the connect portion 31cC. The connect portion 31cC has, for example, a spring structure.

In this example, a direction from the connect portion 31bC to the connect portion 31cC crosses a direction from the first connect portion 31C to the first other connect portion 31aC. In this example, the first conductive member 21 is electrically connected with a wiring provided on the base 41 via the connect portion 31bC, the connect portion 31cC, the support portion 31bS, and the support portion 31cS. The wiring is electrically connected with the controller 70. The first conductive member 21 has a meander structure.

As shown in FIGS. 2 and 3, the second detection unit 10B may further include a support portion 32*b*S and a connect portion 32*b*C. The support portion 32*b*S is fixed to the base 41. The connect portion 32*b*C is supported by the support portion 32*b*S and supports the second detection element 12E. A gap (not shown) is provided between the second base region 41*b* and the connect portion 32*b*C. The connect portion 32*b*C has, for example, a spring structure.

The second detection unit 10B may further include a support portion 32*c*S and a connect portion 32*c*C. The support portion 32*c*S is fixed to the base 41. The connect portion 32*c*C is supported by the support portion 32*c*S and supports the second detection element 12E. A gap (not shown) is provided between the second base region 41*b* and the connect portion 32*c*C. The connect portion 32*c*C has, for example, a spring structure.

In this example, a direction from the connect portion 32*b*C to the connect portion 32*c*C crosses a direction from the second connect portion 32C to the second other connect portion 32*a*C. In this example, the second conductive member 22 is electrically connected with a wiring provided on the base 41 via the connect portion 32*b*C, the connect portion 32*c*C, the support portion 32*b*S, and the support portion 32*c*S. The wiring is electrically connected with the controller 70. The second conductive member 22 has a meander structure. In one example, the shape of the second conductive member 22 may be similar to that of the first conductive member 21.

For example, the first connect portion 31C, the first other connect portion 31*a*C, the connect portion 31*b*C, and the connect portion 31*c*C may have a meander structure. For example, the second connect portion 32C, the second other connect portion 32*a*C, the connect portion 32*b*C, and the connect portion 32*c*C may have a meander structure.

As shown in FIG. 3, the first detection element 11E may include a first layer 15*a* and a second layer 15*b*. The first layer 15*a* and the second layer 15*b* have the same material and thickness as the first resistance member 11. The first resistance member 11 is provided between the first layer 15*a* and the second layer 15*b*. By providing these layers, a warp (deformation) of the first detection element 11E is suppressed.

As shown in FIG. 3, the second detection element 12E may include a third layer 15*c* and a fourth layer 15*d*. The third layer 15*c* and the fourth layer 15*d* have the same material and thickness as the second resistance member 12. The second resistance member 12 is provided between the third layer 15*c* and the fourth layer 15*d*. By providing these layers, a warp (deformation) of the second detection element 12E is suppressed.

As shown in FIG. 1, the sensor 110 may further include a resistance element 16. For example, the resistance element 16 is fixed to the base 41. As will be described later, the controller 70 may derive a difference between an electric signal obtained from the first resistance member 11 and an electric signal obtained from the resistance element 16. The controller 70 may derive a difference between an electric signal obtained from the second resistance member 12 and the electric signal obtained from the resistance element 16. Thereby, for example, the influence of the ambient temperature or the fluctuation of the temperature of the base 41 can be suppressed. Higher accuracy detection is possible. In FIGS. 2 and 3, the resistance element 16 is omitted. A plurality of resistance elements 16 may be provided. For example, a difference between the electric signal obtained from the first resistance member 11 and an electric signal obtained from one of the plurality of resistance elements 16 may be derived. For example, a difference between the electric signal obtained from the second resistance member 12 and an electric signal obtained from another one of the plurality of resistance elements 16 may be derived.

Figure 4:
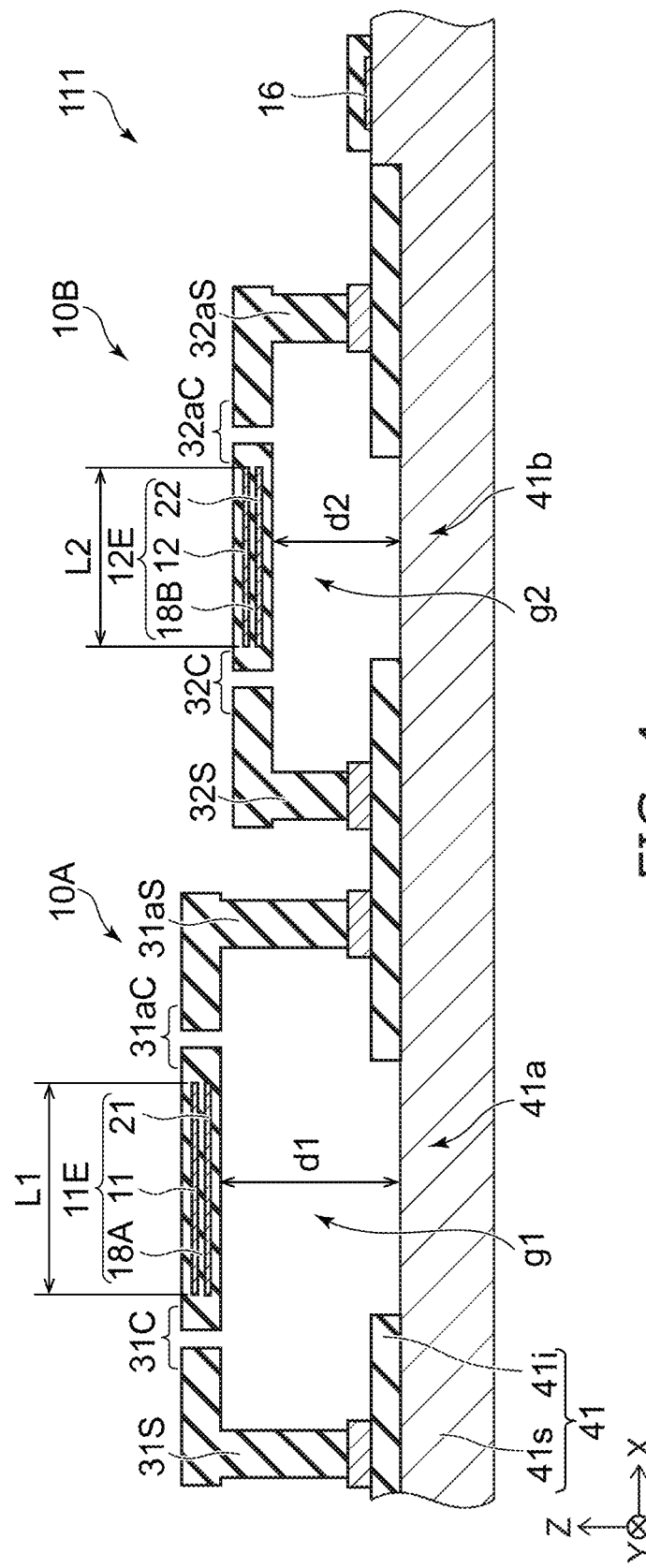
FIG. 4 is a schematic cross-sectional view illustrating a sensor according to the first embodiment.

FIG. 4 is a schematic cross-sectional view illustrating a sensor according to the first embodiment.

FIG. 4 is a cross-sectional view corresponding to the A1-A2 line cross section of FIG. 2. As shown in FIG. 4, in a sensor 111 according to the embodiment, the heights of the first detection element 11E and the second detection element 12E with respect to the base 41 are different. The configuration of the sensor 111 other than this may be the same as that of the sensor 110.

In the sensor 111, a first distance d1 in the first direction (Z-axis direction) between the first base region 41*a* and the first detection element 11E is different from a second distance d2 in the first direction between the second base region 41*b* and the second detection element 12E. These distances correspond to the length of the gap (the first gap g1 and the second gap g2). Since these distances are different from each other, the heat dissipation characteristics from these detection elements via the base 41 are different. Different heat dissipation characteristics can be obtained. By utilizing the difference in heat dissipation characteristics, it is possible to detect with higher accuracy.

For example, the first distance d1 is longer than the second distance d2. Due to the first distance d1 being long, heat dissipation from the base 41 of the first detection element 11E is suppressed more than that of the second detection element 12E. For example, the first area S1 of the first detection element 11E is larger than the second area S2 of the second detection element 12E. Due to the difference in area and the difference in distance (difference in length of the gap), the difference in heat dissipation characteristics can be obtained more effectively.

Second Embodiment

Figure 5:
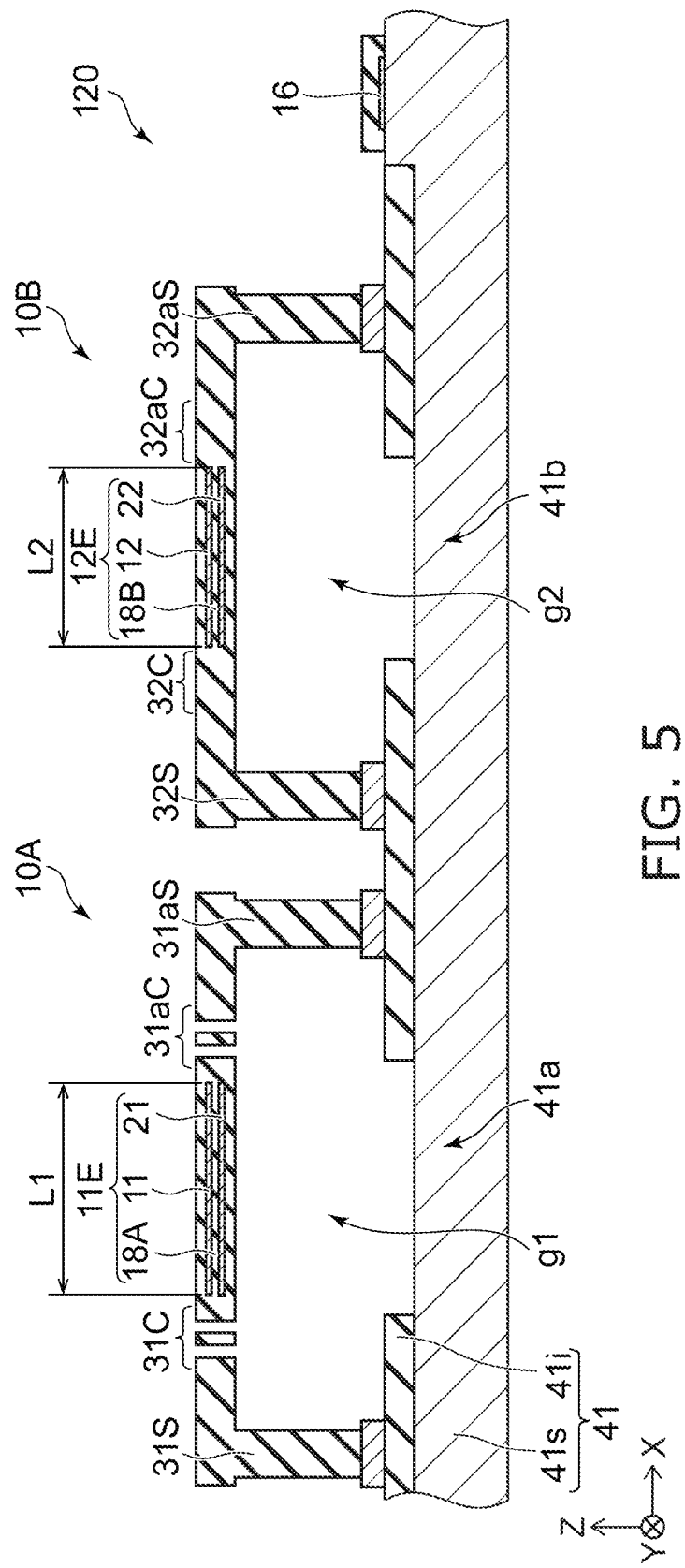
FIG. 5 is a schematic diagram illustrating a sensor according to a second embodiment.
Figure 6:
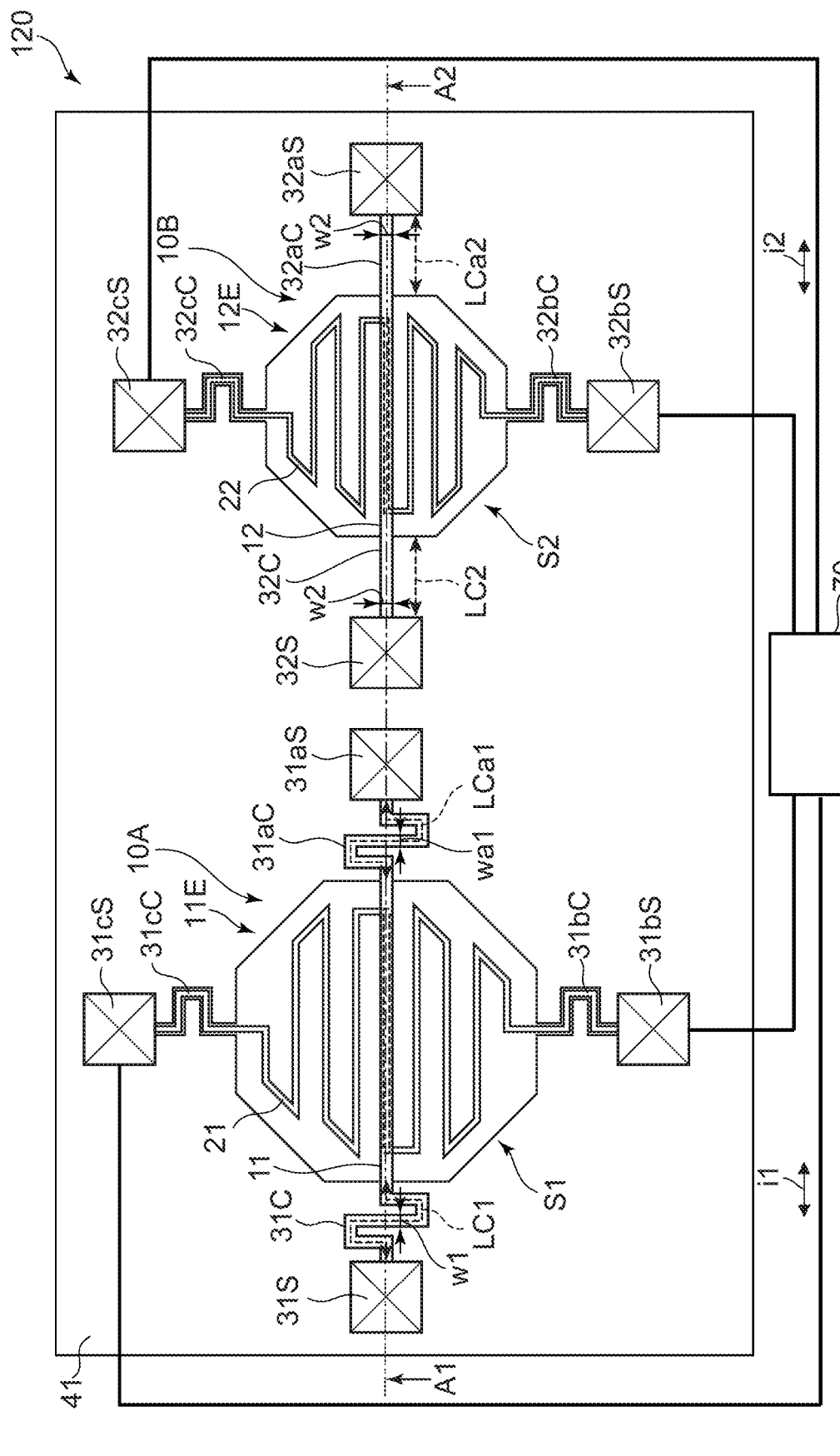
FIG. 6 is a schematic diagram illustrating the sensor according to the second embodiment.
Figure 7:
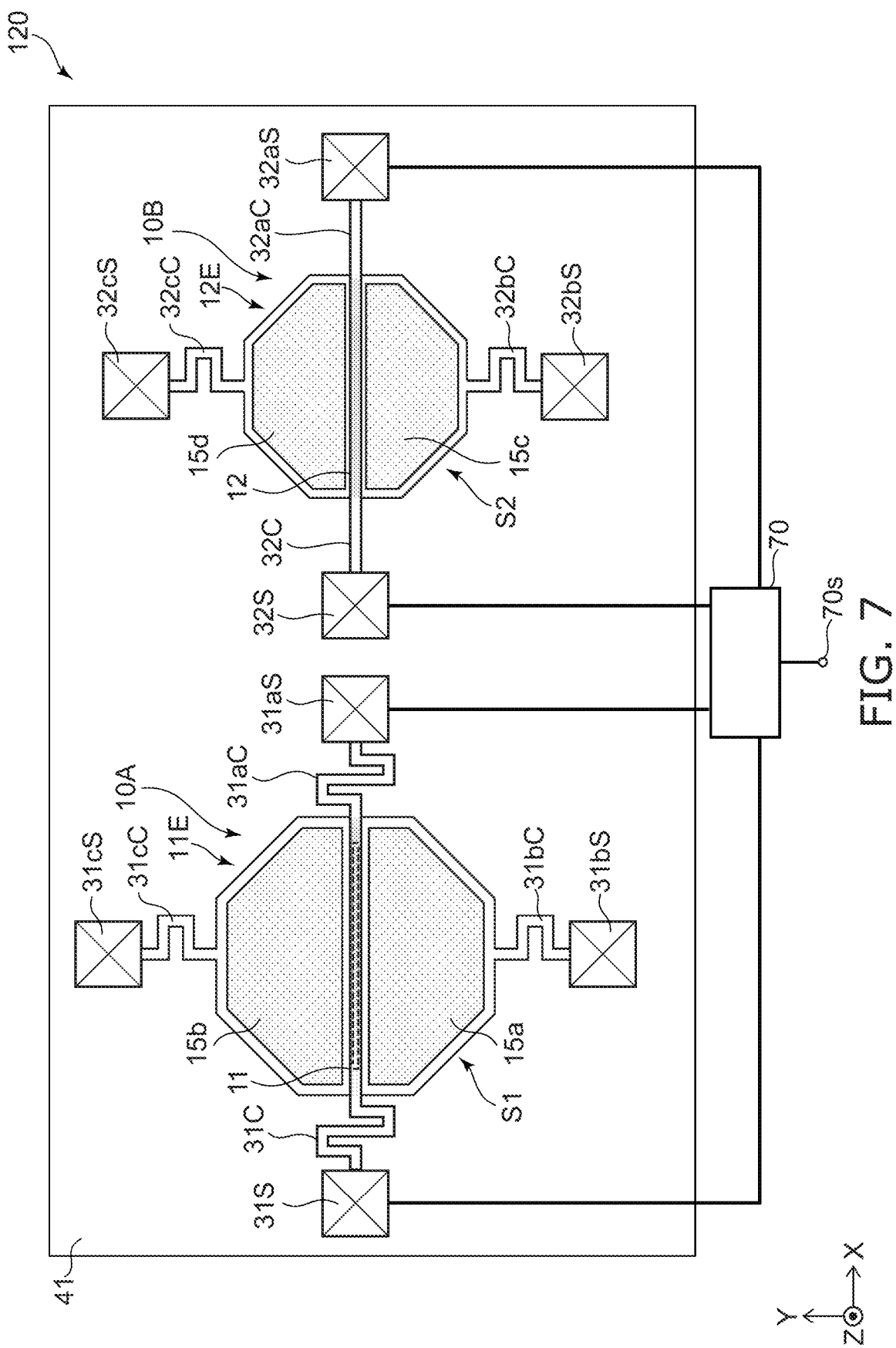
FIG. 7 is a schematic diagram illustrating the sensor according to the second embodiment.

FIGS. 5 to 7 are schematic views illustrating a sensor according to the second embodiment.

FIG. 5 is a cross-sectional view taken along the line A1-A2 of FIG. 6. FIGS. 6 and 7 are plan views. As shown in FIGS. 5 to 7, a sensor 120 according to the embodiment includes the base 41, the first detection unit 10A, and the second detection unit 10B. In the sensor 120, the configuration of the connect portion included in the detection unit is different from the configuration in the sensor 110. For example, the thermal resistance of the connect portion included in the first detection unit 10A is different from the thermal resistance of the connect portion included in the second detection unit 10B. Except for this, the configuration of the sensor 120 may be the same as the configuration of the sensor 110 or the sensor 111.

As shown in FIGS. 5 to 7, in the sensor 120, for example, the first detection unit 10A includes the first support portion 31S and the first connect portion 31C. The first support portion 31S is fixed to the base 41. The first connect portion 31C is supported by the first support portion 31S and supports the first detection element 11E. A gap is provided between the first base region 41*a* and the first connect portion 31C.

The second detection unit 10B includes the second support portion 32S and the second connect portion 32C. The second support portion 32S is fixed to the base 41. The second connect portion 32C is supported by the second support portion 32S and supports the second detection element 12E. A gap is provided between the second base region 41b and the second connect portion 32C.

As shown in FIG. 6, in the sensor 120, the first connect portion 31C has the first connect portion length LC1. The first connect portion length LC1 is a length of the first connect portion 31C along a path (first connect portion path) between the first support portion 31S and the first detection element 11E.

As shown in FIG. 6, the second connect portion 32C has a second connect portion length LC2. The second connect portion length LC2 is a length of the second connect portion 32C along a path (second connect portion path) between the second support portion 32S and the second detection element 12E. The second connect portion length LC2 is different from the first connect portion length LC1. Due to such a difference in length, a difference is provided in the thermal resistance of the connect portion. For example, there is a difference in heat dissipation characteristics via the connect portion. By utilizing the difference in heat dissipation characteristics via the connect portion, it is possible to detect the substance to be detected with higher accuracy. According to the embodiment, it is possible to provide a sensor whose characteristics can be improved. For example, the concentration of each of a plurality of different types of substances can be detected with high accuracy. In the embodiment, the measurement time is short.

As shown in FIG. 6, in the sensor 120, the first other connect portion 31aC has the first other connect portion length LCa1. The first other connect portion length LCa1 is a length of the first other connect portion 31aC along a path (first other connect portion path) between the first other support portion 31aS and the first detection element 11E.

As shown in FIG. 6, the second other connect portion 32aC has the second other connect portion length LCa2. The second other connect portion length LCa2 is a length of the second other connect portion 32aC along a path (second other connect portion path) between the second other support portion 32aS and the second detection element 12E. The second other connect portion length LCa2 is different from the first other connect portion length LCa1. Due to such a difference in length, a difference is provided in the thermal resistance of the other connect portions.

In this example, the second connect portion length LC2 is shorter than the first connect portion length LC1. In this example, the second other connect portion length LCa2 is shorter than the first other connect portion length LCa1.

In the sensor 120, the first area S1 may be the same as or different from the second area S2. In this example, the first area S1 is larger than the second area S2. In this case, the second connect portion length LC2 is shorter than the first connect portion length LC1. The difference in heat dissipation characteristics based on the difference in area and the difference in heat dissipation characteristics based on the difference in length of the connect portion are used. Thereby, the difference in heat dissipation characteristics can be obtained more effectively.

In the embodiment, for example, the length of the connect portion 31bC along the path of the connect portion 31bC may be different from the length of the connect portion 32bC along the path of the connect portion 32bC. The length of the connect portion 31cC along the path of the connect portion 31cC may be different from the length of the connect portion 32cC along the path of the connect portion 32cC.

As shown in FIG. 6, the first connect portion 31C has a first connect portion width w1. The first connect portion width w1 is a width of the first connect portion 31C along a direction crossing the first connect portion path between the first support portion 31S and the first detection element 11E. The second connect portion 32C has a second connect portion width w2. The second connect portion width w2 is a width of the second connect portion 32C in a direction crossing the second connect portion path between the second support portion 32S and the second detection element 12E. The second connect portion width w2 may be different from the first connect portion width w1. Due to the difference in width, a difference is provided in the thermal resistance of the connect portion. By utilizing the difference in heat dissipation characteristics via the connect portion, it is possible to detect the substance to be detected with higher accuracy. According to the embodiment, it is possible to provide a sensor whose characteristics can be improved. For example, the concentration of each of a plurality of different types of substances can be detected with high accuracy.

As shown in FIG. 6, the first other connect portion 31aC has a first other connect portion width wa1. The first other connect portion width wa1 is a width of the first other connect portion 31aC in a direction crossing the first other connect portion path between the first other support portion 31aS and the first detection element 11E. The second other connect portion 32aC has a second other connect portion width wa2. The second other connect portion width wa2 is a width of the second other connect portion 32aC in a direction crossing the second other connect portion path between the second other support portion 32aS and the second detection element 12E. The second other connect portion width wa2 is different from the first other connect portion width wa1. Due to the difference in width, a difference is provided in the thermal resistance of the connect portion.

In the sensor 120, at least one of the difference in length or the difference in width may be provided between the connect portion of the first detection unit 10A and the connect portion of the second detection unit 10B.

Figure 8:
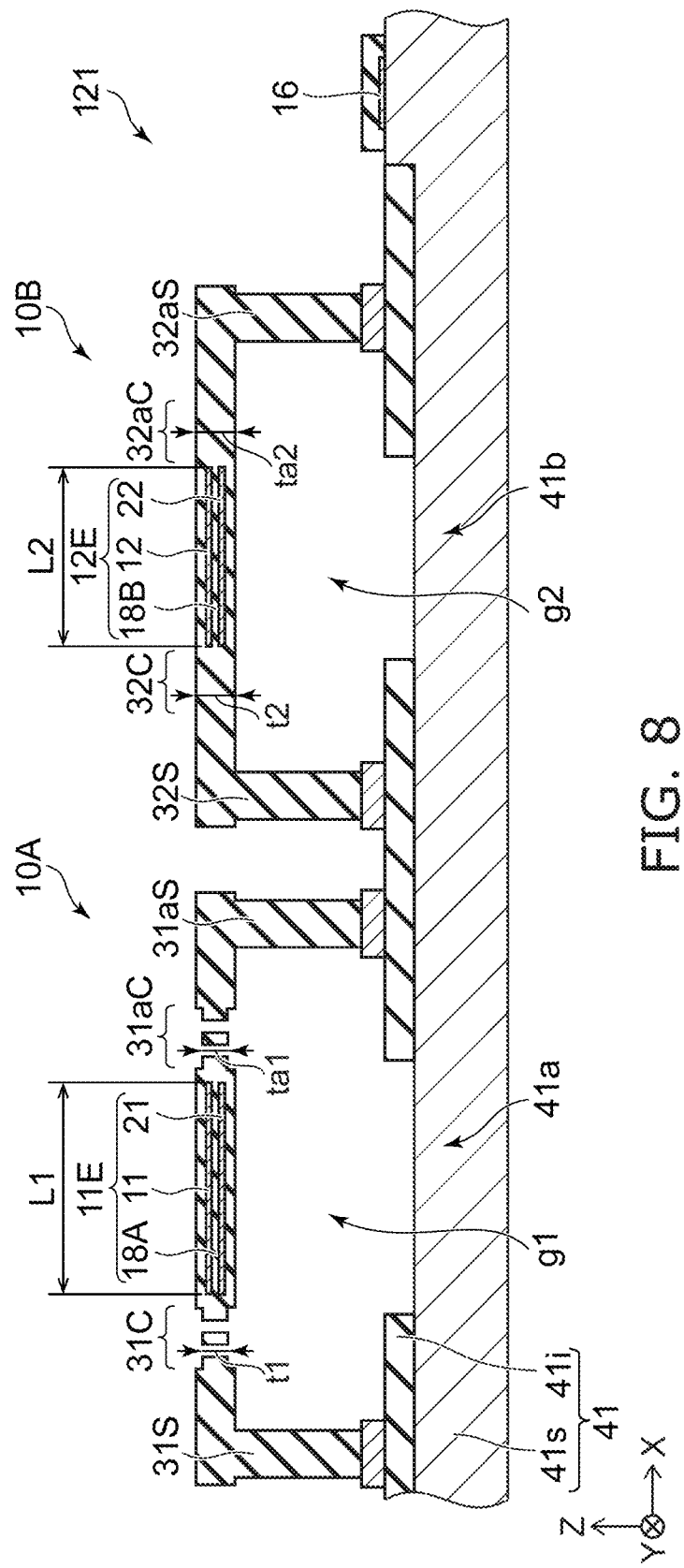
FIG. 8 is a schematic cross-sectional view illustrating a sensor according to the second embodiment.

FIG. 8 is a schematic cross-sectional view illustrating a sensor according to the second embodiment.

FIG. 8 is a cross-sectional view corresponding to the A1-A2 line cross section of FIG. 6. As shown in FIG. 8, in a sensor 121 according to the embodiment, the thickness of the connect portion differs between the plurality of detection elements. Except for this, the configuration of the sensor 121 may be the same as the configuration of the sensor 110 or the sensor 111.

As shown in FIG. 8, in the sensor 121, the first connect portion 31C has a first connect portion thickness t1. The first connect portion thickness t1 is a thickness of the first connect portion 31C in the first direction (Z-axis direction). The second connect portion 32C has a second connect portion thickness t2. The second connect portion thickness t2 is a thickness of the second connect portion 32C in the first direction (Z-axis direction). The second connect portion thickness t2 is different from the first connect portion thickness t1. Due to such a difference in thickness, a difference is provided in the thermal resistance of the connect portion. For example, there is a difference in heat dissipation characteristics via the connect portion. By utilizing the difference in heat dissipation characteristics via the connect portion, it is possible to detect the substance to be detected with higher accuracy. According to the embodiment, it is possible to provide a sensor whose characteristics can be improved. For example, the concentration of each of a plurality of different types of substances can be detected with high accuracy. In the embodiment, the measurement time is short.

In the sensor 121, the first other connect portion 31aC has a first other connect portion thickness ta1. The first other connect portion thickness ta1 is a thickness of the first other connect portion 31aC in the first direction (Z-axis direction). The second other connect portion 32aC has a second other connect portion thickness ta2. The second other connect portion thickness ta2 is a thickness of the second other connect portion 32aC in the first direction (Z-axis direction). The second other connect portion 32aC is different from the first other connect portion thickness ta1. Due to such a difference in thickness, a difference is provided in the thermal resistance of the connect portion. For example, there is a difference in heat dissipation characteristics via the connect portion.

In the sensor 121, at least one of the difference in the length of the connect portion or the difference in the width of the connect portion may be provided as in the example of the sensor 120. The thermal resistance of the connect portion may be different due to the difference in the length of the connect portion, the difference in the width of the connect portion, and the difference in the thickness of the connect portion.

In this example, the thickness t2 of the second connect portion is thicker than the thickness t1 of the first connect portion. In this example, the thickness ta2 of the second other connect portion is thicker than the thickness ta1 of the first other connect portion.

In the sensor 121, the first area S1 may be the same as or different from the second area S2. In this example, the first area S1 is larger than the second area S2. In this case, the thickness t2 of the second connect portion is thicker than the thickness t1 of the first connect portion. The difference in heat dissipation characteristics based on the difference in area and the difference in heat dissipation characteristics based on the difference in thickness of the connect portion are used. Thereby, the difference in heat dissipation characteristics can be obtained more effectively.

Figure 9:
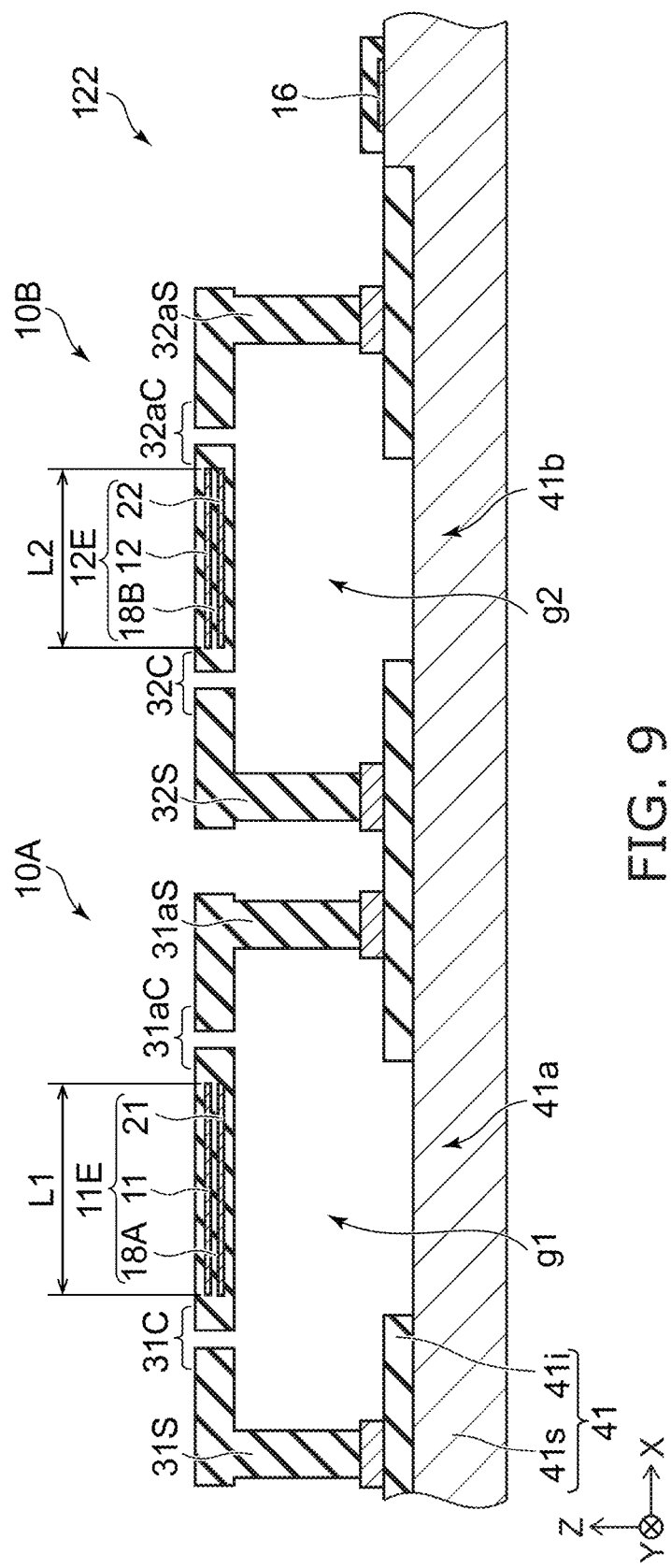
FIG. 9 is a schematic cross-sectional view illustrating a sensor according to the second embodiment.

FIG. 9 is a schematic cross-sectional view illustrating a sensor according to the second embodiment.

FIG. 9 is a cross-sectional view corresponding to the A1-A2 line cross section of FIG. 6. As shown in FIG. 9, in a sensor 122 according to the embodiment, a connect portion is provided for each of the plurality of detection elements. In the sensor 122, the materials of the connect portions of the plurality of detection elements are different from each other. Except for this, the configuration of the sensor 122 may be the same as the configuration of the sensor 110 or the sensor 111.

In the sensor 122, the first connect portion 31C includes a first connect portion material. The second connect portion 32C includes a second connect portion material different from the first connect portion material. Due to such a difference in materials, a difference is provided in the thermal resistance of the connect portion. For example, there is a difference in heat dissipation characteristics via the connect portion.

In the sensor 122, a difference may be provided in the length of the connect portion as in the example of the sensor 120. In the sensor 122, a difference may be provided in the thickness of the connect portion as in the example of the sensor 121. A difference may be provided in the thermal resistance of the connect portion due to at least one of a difference in the length of the connect portion, a difference in the thickness of the connect portion, or a difference in the material of the connect portion.

For example, the thermal conductivity of the material of the second connect portion is different from the thermal conductivity of the material of the first connect portion. For example, the thermal conductivity of the second connection material is higher than the thermal conductivity of the first connection material.

In the sensor 122, the first area S1 may be the same as or different from the second area S2. In this example, the thermal conductivity of the second connection material is higher than the thermal conductivity of the first connection material. The difference in heat dissipation characteristics based on the difference in area and the difference in heat dissipation characteristics based on the difference in thermal conductivity of the connect portion are used. Thereby, the difference in heat dissipation characteristics can be obtained more effectively.

The configurations of the sensors 120 to 122 may be combined. For example, the first connect portion 31C includes the first connect portion length LC1, the first connect portion width w1, the first connect portion thickness t1, and the first connect portion material. The first connect portion length LC1 is the length of the first connect portion 31C along the first connect portion path between the first support portion 31S and the first detection element 11E. The first connect portion width w1 is the width of the first connect portion 31C in a direction crossing the first connect portion path. The first connect portion thickness t1 is the thickness of the first connect portion 31C in the first direction (Z-axis direction).

The second connect portion 32C has at least one of a second connect portion length LC2 different from the first connect portion length LC1, a second connect portion width w2 different from the first connect portion width w1, a second connect portion thickness t2 different from the first connect portion thickness t1, or a second connection material different from the first connection material. The second connect portion length LC2 is a length of the second connect portion 32C along the second connect portion path between the second support portion 32S and the second detection element 12E. The second connect portion width w2 is a width of the second connect portion 32C in a direction crossing the second connect portion path. The second connect portion thickness t2 is a thickness of the second connect portion 32C in the first direction (Z-axis direction).

For example, in one example, the second connect portion length LC2 is shorter than the first connect portion length LC1. The second connect portion width w2 is larger than the first connect portion width w1. The second connect portion thickness t2 is thicker than the first connect portion thickness t1. The thermal conductivity of the second connection material is higher than the thermal conductivity of the first connection material. For example, the second connect portion 32C has at least one of a second connect portion length LC2 shorter than the first connect portion length LC1, a second connect portion width w2 larger than the first connect portion width w1, a second connect portion thickness t2 thicker than the first connect portion thickness t1, a thermal conductivity of the second connect portion material higher than the thermal conductivity of the first connect portion material. The difference in thermal resistance can be effectively obtained.

For example, the first other connect portion 31aC includes a first other connect portion length LCa1, a first other connect portion width wa1, a first other connect portion thickness ta1, and a first other connect portion material. The first other connect portion length LCa1 is a length of the first other connect portion 31aC along the first other connect portion path between the first other support portion 31aS and the first detection element 11E. The first other connect portion width wa1 is a width of the first other connect portion 31aC in a direction crossing the first other connect portion path. The first other connect portion thickness ta1 is a thickness of the first other connect portion 31aC in the first direction (Z-axis direction).

For example, the second other connect portion 32aC has a second other connect portion length LCa2 different from the first other connect portion length LCa1, a second other connect portion width wag different from the first other connect portion width wa1, a second other connect portion thickness ta2 different from the first other connect portion thickness ta1, or a second other connect portion material different from the first other connect portion material. The second other connect portion length LCa2 is a length of the second other connect portion 32aC along the second other connect portion path between the second other support portion 32aS and the second detection element 12E. The second other connect portion width wa2 is a width of the second other connect portion 32aC in a direction crossing the second other connect portion path. The second other connect portion thickness ta2 is a thickness of the second other connect portion 32aC in the first direction (Z-axis direction).

For example, in one example, the second other connection part length LCa2 is shorter than the first other connection part length LCa1. The second other connect portion width wa2 is larger than the first other connect portion width wa1. The thickness ta2 of the second other connect portion is thicker than the thickness ta1 of the first other connect portion. The thermal conductivity of the material of the second other connect portion is higher than the thermal conductivity of the material of the first other connect portion. The difference in thermal resistance can be effectively obtained.

Figure 10:
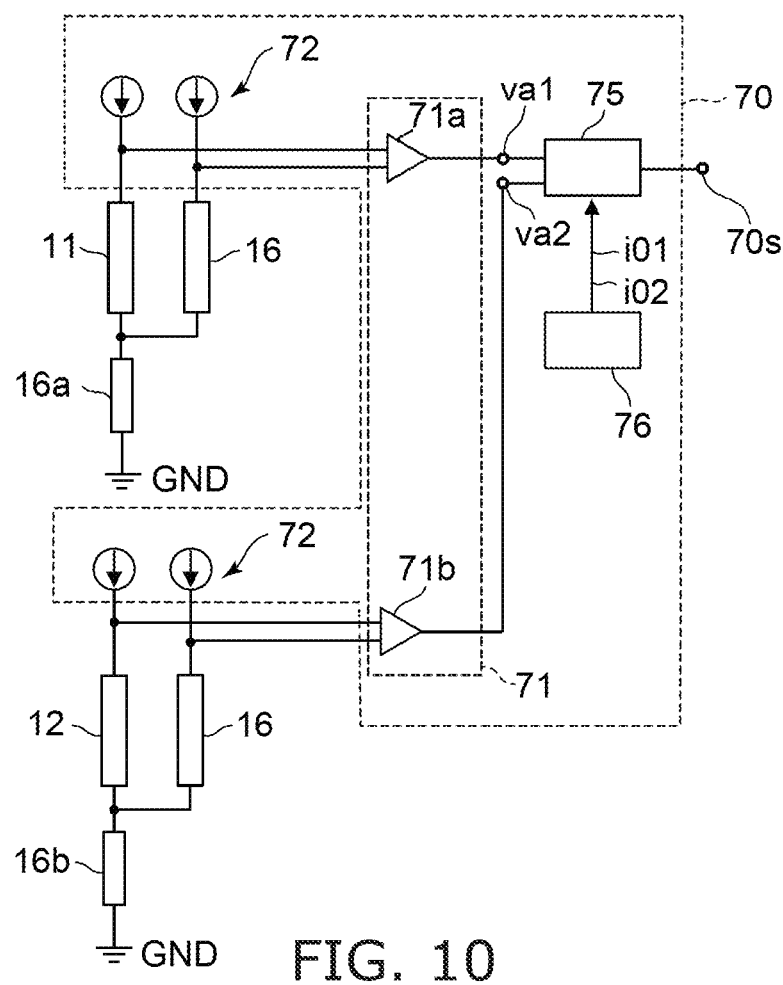
FIG. 10 is a schematic diagram illustrating a sensor according to an embodiment.

FIG. 10 is a schematic diagram illustrating a sensor according to the embodiment.

FIG. 10 shows an example of the controller 70. As described above, a sensor according to the embodiment (for example, the sensor 110) may include a resistance element 16 provided on the base 41.

As shown in FIG. 10, the controller 70 may include the differential circuit 71. The differential circuit 71 may include a first differential circuit 71a and a second differential circuit 71b.

In this example, the first resistance member 11 and the resistance element 16 are electrically connected in parallel. A resistor 16a is connected in series to the first resistance member 11 and the resistance element 16 and electrically connected with the ground GND. A current is supplied from the constant current source 72 to the first resistance member 11 and the resistance element 16 connected in parallel. A voltage of the first resistance member 11 is input to one input terminal of the first differential circuit 71a. A voltage of the resistance element 16 is input to another input terminal of the first differential circuit 71a.

The second resistance member 12 and the resistance element 16 are electrically connected in parallel. A resistor 16b is connected in series to the second resistance member 12 and the resistance element 16 and electrically connected with the ground GND. A current is supplied from the constant current source 72 to the second resistance member 12 and the resistance element 16 connected in parallel. A voltage of the second resistance member 12 is input to one input terminal of the second differential circuit 71b. Ae voltage of the resistance element 16 is input to another input terminal of the second differential circuit 71b.

The differential circuit 71 (first differential circuit 71a) in configured to derive a value (a first value va1) corresponding to a difference between a potential corresponding to the resistance element 16 and a potential corresponding to the first resistance member 11. The differential circuit 71 (second differential circuit 71b) is configured to derive a value (second value va2) corresponding to the potential corresponding to the resistance element 16 and a potential corresponding to the second resistance member 12. These values are, for example, voltage.

In the above, a voltage may be applied to each of the first resistance member 11 and the second resistance member 12. These voltages may be the same as each other. The configuration in which the same voltage is applied simplifies the circuit, for example.

For example, the outputs (first value va1 and second value va2) of the first differential circuit 71a and the second differential circuit 71b are supplied to a processor 75. The processor 75 performs detection based on these values. The controller 70 outputs a detection signal 70s (information) including the detection result.

The controller 70 is configured to perform following first operation. In the first operation, the controller 70 supplies the first current i1 to the first conductive member 21 to raise the temperature of the first detection element 11E. In the first operation, the controller 70 supplies the second current i2 to the second conductive member 22 to raise the temperature of the second detection element 12E. In the first operation, the controller 70 derives the first value va1 corresponding to the first electric resistance of the first resistance member 11. In the first operation, the controller 70 derives the second value va2 corresponding to the second electric resistance of the second resistance member 12.

In the first operation, based on the first value va1 and the second value va2, the controller 70 is configured to output a detection signal 70s including a first detection value and a second detection value, the first detection value corresponding to the concentration of a first substance included in a space around the first detection element 11E and the second detection element 12E, the second detection value corresponding to the concentration of a second substance included in the space. The first detected value and the second detected value may be obtained, for example, by the processor 75 included in the controller 70.

For example, the controller 70 (processor 75) is configured to derive the above-mentioned first detection value and the above-mentioned second detection value based on the first information i01 and the second information i02 (see FIG. 10). For example, the first information i01 relates to the relationship between the concentration of the first substance and the first value va1 for the first detection element 11E, and the relationship between the concentration of the second substance and the first value va1 for the first detection element 11E. The second information i02 relates to the relationship between the concentration of the first substance and the second value va2 for the second detection element 12E, and the relationship between the concentration of the second substance and the second value va2 for second detection element 12E.

The first information i01 is acquired in advance for, for example, for the first detection element 11E. The second information i02 is acquired in advance for, for example, for the second detection element 12E. The information may include an equation (for example, an approximate equation)

showing the relationship between the concentration and the value. The information may be a table including the relationship between the concentration and the value.

As shown in FIG. 10, a storage 76 may be provided. The controller 70 may include the storage 76. The storage 76 stores the first information i01 and the second information i02. The controller 70 (processor 75) reads the first information i01 and the second information i02 from the storage 76. The processor 75 is configured to output the detection signal 70s including the first detection value and the second detection value based on the read first information i01 and the read second information i02 and the measured first value va1 and measured second value vat. The first detection value corresponds to the concentration of the first substance included in the space around the first detection element 11E and the second detection element 12E. The second detection value corresponds to the concentration of the second substance included in the space.

Figure 11A:
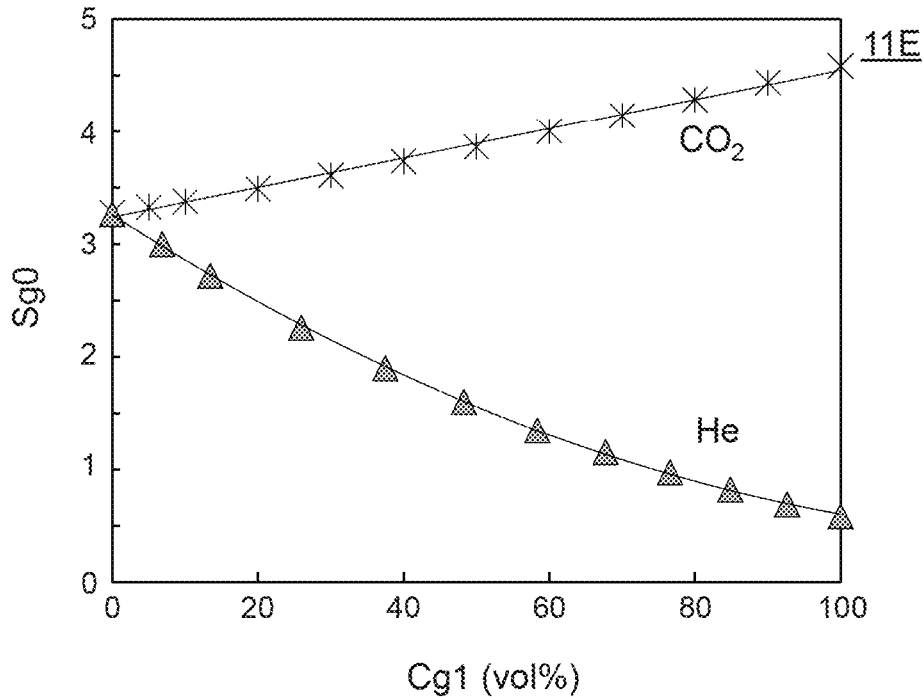
FIGS. 11A and 11B are graphs illustrating the characteristics of the sensor according to the embodiment.
Figure 11B:
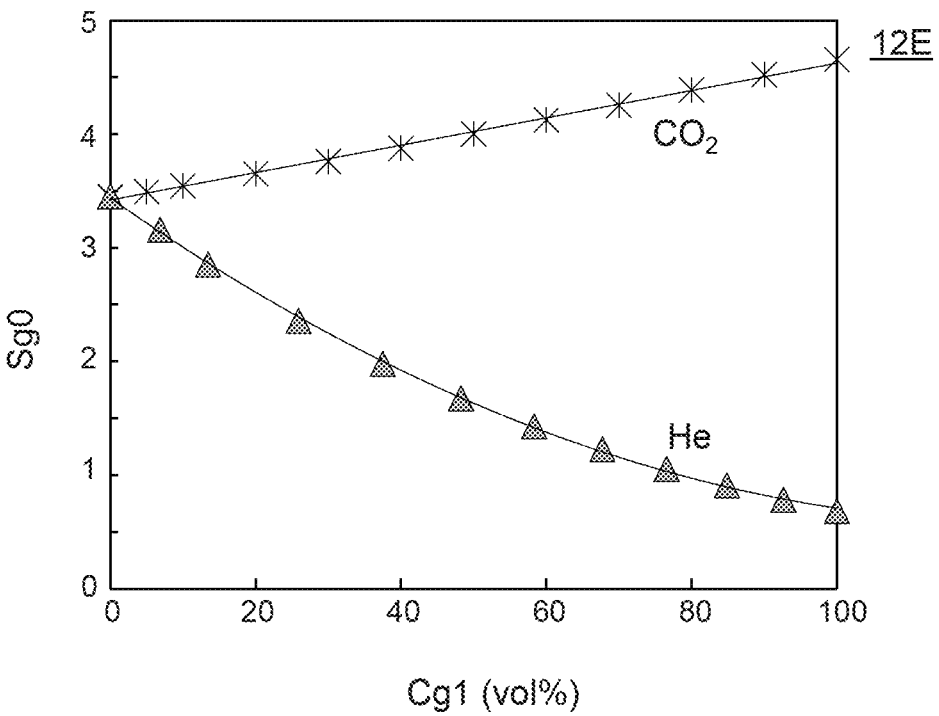

FIGS. 11A and 11B are graphs illustrating the characteristics of the sensor according to the embodiment.

FIG. 11A corresponds to the first detection element 11E. FIG. 11B corresponds to the second detection element 12E. The horizontal axis of these figures is the concentration Cg1 of the substance included in the space. These figures exemplify the characteristics when the first substance included in the space is carbon dioxide ($CO_2$) and characteristics when the second substance included in the space is helium (He). In these cases, the space includes nitrogen ($N_2$) as a third substance in addition to the above substances. When the first substance is carbon dioxide, the concentration Cg1 corresponds to the concentration of the first substance with respect to the sum of carbon dioxide (first substance) and nitrogen (third substance). When the second substance is helium, the concentration Cg1 corresponds to the concentration of the second substance with respect to the sum of helium (second substance) and nitrogen (third substance). The vertical axis of FIG. 11A is a signal value Sg0 (for example, voltage) obtained from the first detection element 11E. The vertical axis of FIG. 11B is a signal value Sg0 (for example, voltage) obtained from the second detection element 12E.

As shown in FIGS. 11A and 11B, the signal value Sg0 depends on the concentration Cg1. In this example, the signal value Sg0 for carbon dioxide is approximately represented by a linear function of the carbon dioxide concentration Cg1. The signal value Sg0 for helium is approximately represented by a quadratic function of the helium concentration Cg1.

Regarding carbon dioxide, at least one coefficient included in the linear function is different between the first detection element 11E and the second detection element 12E. With respect to helium, at least one coefficient included in the quadratic function differs between the first detection element 11E and the second detection element 12E. The above coefficient for carbon dioxide is at least a part of the first information i01. The above coefficients for helium are at least part of the second information i02. Such characteristics are acquired in advance and stored in, for example, the storage 76.

For example, a function for the signal value Sg0 when the first substance and the second substance are included may be derived from these a plurality of functions. This function may be stored in the storage 76.

Similarly, for other substances (for example, hydrogen or methane), the coefficient of the function may be obtained in advance. Information including these coefficients is stored in the storage 76.

On the other hand, in the detection using the sensor, the measurement data (first value va1 and second value vat) obtained from the first detection element 11E and the second detection element 12E are acquired. The acquired measurement data is processed using the above-mentioned stored information (for example, the coefficient included in the function). As a result, the first detected value corresponding to the concentration of the first substance and the second detected value corresponding to the concentration of the second substance are derived from the measurement data. Even when these a plurality of substances to be detected are included in the space, it is possible to detect each of the concentrations of the plurality of substances to be detected with high accuracy.

Figure 12A:
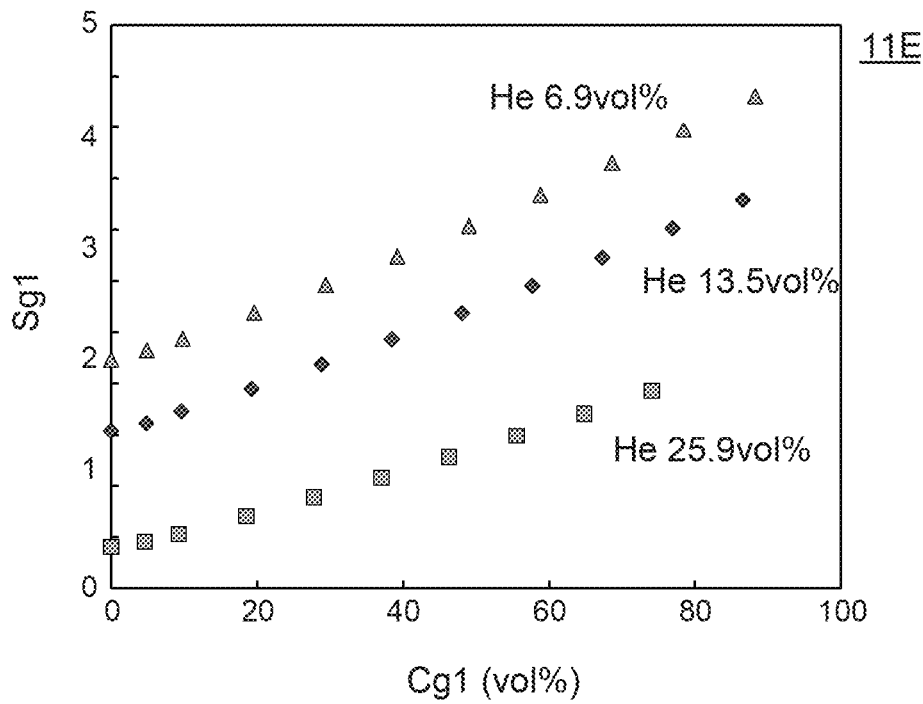
FIGS. 12A and 12B are graphs illustrating the characteristics of the sensor according to the embodiment.
Figure 12B:
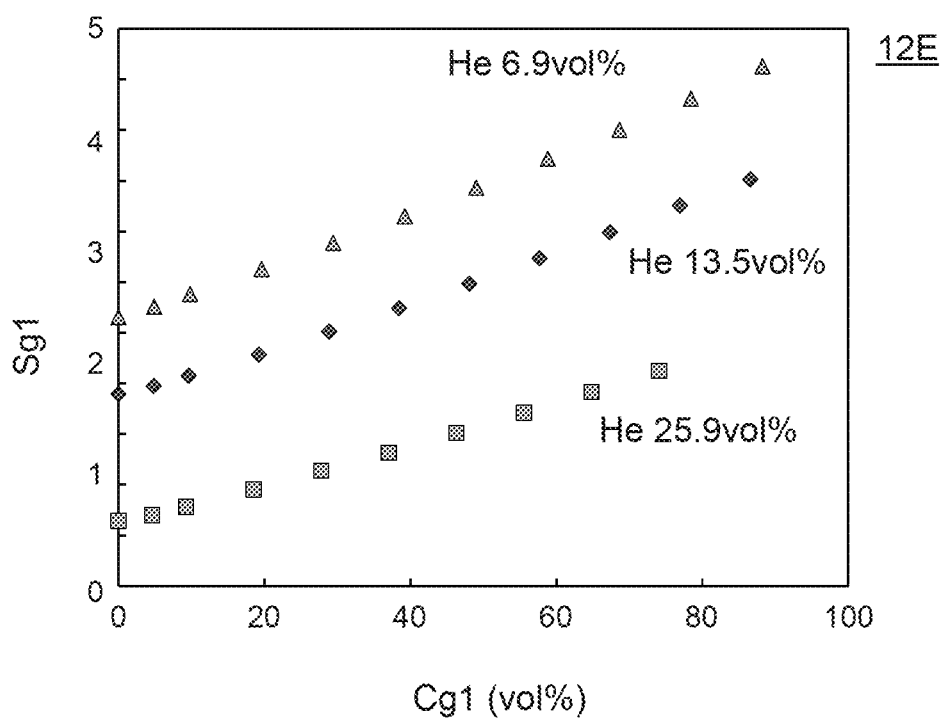

FIGS. 12A and 12B are graphs illustrating the characteristics of the sensor according to the embodiment.

FIG. 12A corresponds to the first detection element 11E. FIG. 12B corresponds to the second detection element 12E. These figures exemplify the signal value Sg1 (for example, voltage) when the space includes carbon dioxide (first substance), helium (second substance) and nitrogen (third substance). The horizontal axis of these figures is the carbon dioxide concentration Cg1. The vertical axis of these figures is the signal value Sg1. In this example, the change in the signal value Sg1 with respect to the carbon dioxide concentration Cg1 is exemplified when the helium concentration is 6.9 vol %, 13.5 vol %, or 25.9 vol %, respectively.

As shown in FIGS. 12A and 12B, when the space includes carbon dioxide (first substance), helium (second substance) and nitrogen (third substance), the signal value Sg1 corresponding to each of the concentrations of carbon dioxide (first substance) and helium (second substance) can be obtained. Based on the signal value Sg1 obtained from the first detection element 11E and the signal value Sg1 obtained from the second detection element 12E, the concentration of carbon dioxide (first substance) and the concentration of helium (second substance) can be derived.

Third Embodiment

Figure 13:
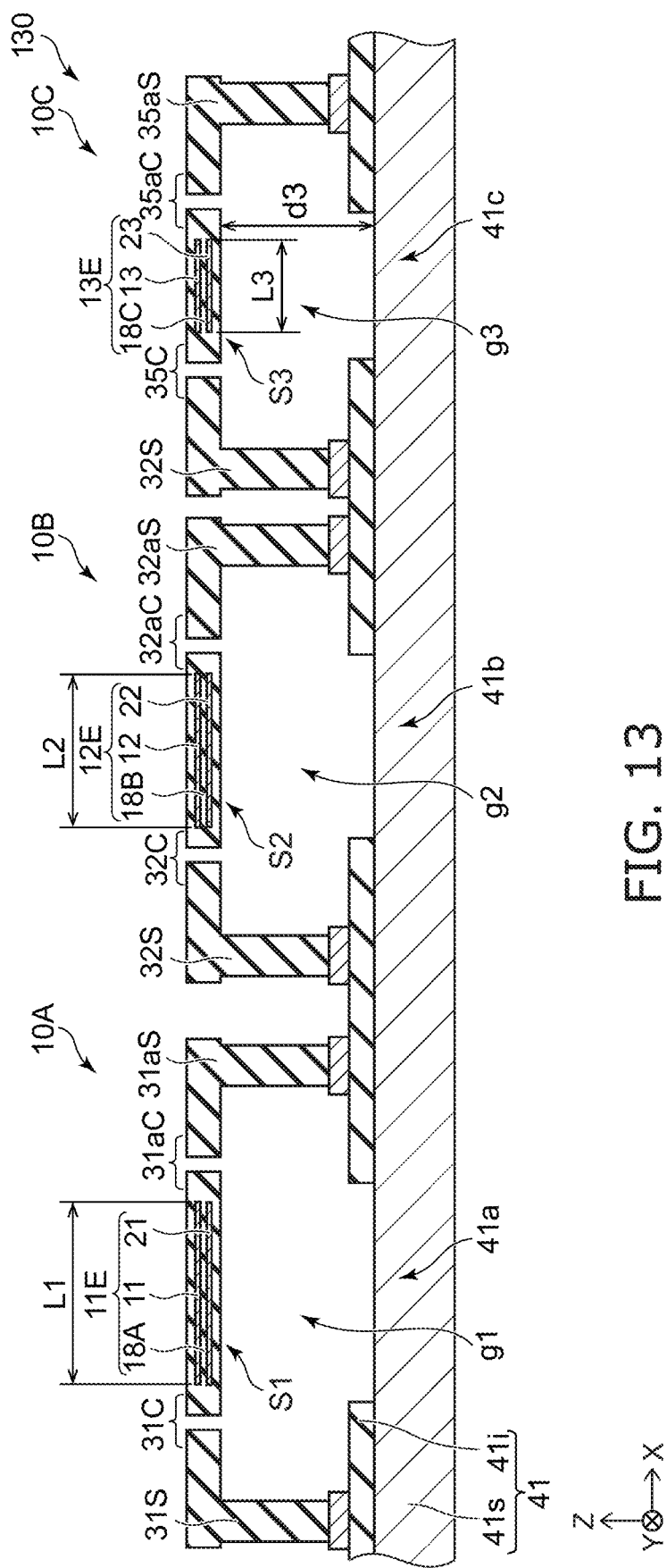
FIG. 13 is a schematic cross-sectional view illustrating a sensor according to a third embodiment.

FIG. 13 is a schematic cross-sectional view illustrating a sensor according to a third embodiment.

As shown in FIG. 13, a sensor 130 according to the embodiment may further include a third detection unit 10C in addition to the first detection unit 10A and the second detection unit 10B. Except for this, the configuration of the sensor 130 may be the same as the configuration of the sensor according to the first embodiment or the second embodiment.

In the sensor 130, the base 41 further includes a third base region 41c. The third detection unit 10C includes a third detection element. The third detection element 13E includes a third resistance member 13, a third conductive member 23, and a third insulating member 18C. At least a part of the third insulating member 18C is between the third resistance member 13 and the third conductive member 23. A third gap g3 is provided between the third base region 41c and the third detection element 13E. The third detection element 13E has a third area S3 in the above-mentioned plane (X-Y plane). The third area S3 is different from the first area S1 and different from the second area S2.

For example, the first detection element 11E has a first length L1 in a direction crossing the first direction (Z-axis direction). The second detection element 12E has a second length L2 in the direction crossing the first direction. The third detection element 13E has a third length L3 in the direction crossing the first direction. The second length L2 is different from the first length L1. The third length L3 is different from the first length L1 and different from the second length L2. In this example, the second length L2 is shorter than the first length L1. In this example, the third length L3 is shorter than the second length L2.

For example, by providing three or more detection elements having different heat dissipation characteristics, it is possible to detect a substance with high accuracy even when the types of substances (gas) included in the space increase.

In the sensor 130, the third distance d3 in the first direction (Z-axis direction) between the third base region 41c and the third detection element 13E may be different from at least one of the first distance d1 (see FIG. 4) or the second distance d2 (FIG. 4).

Figure 14:
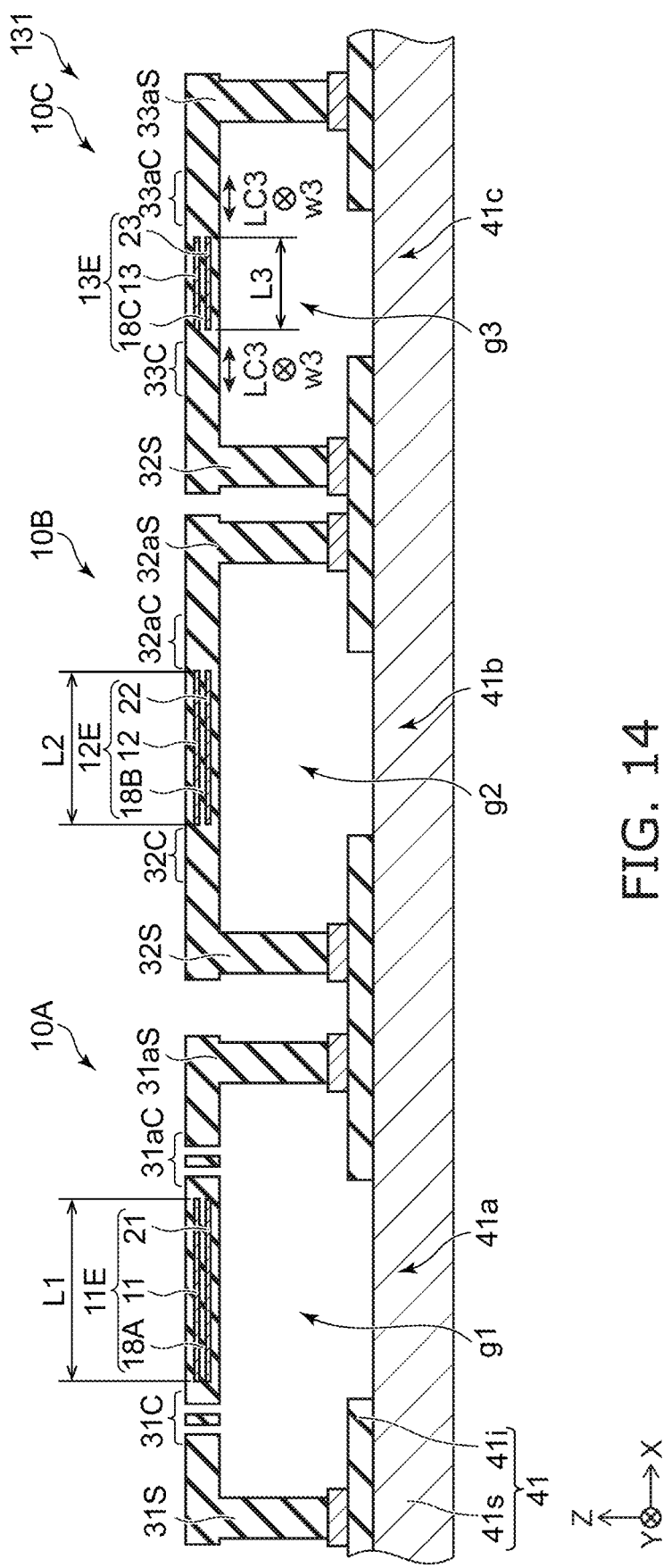
FIG. 14 is a schematic cross-sectional view illustrating a sensor according to the third embodiment.
Figure 15:
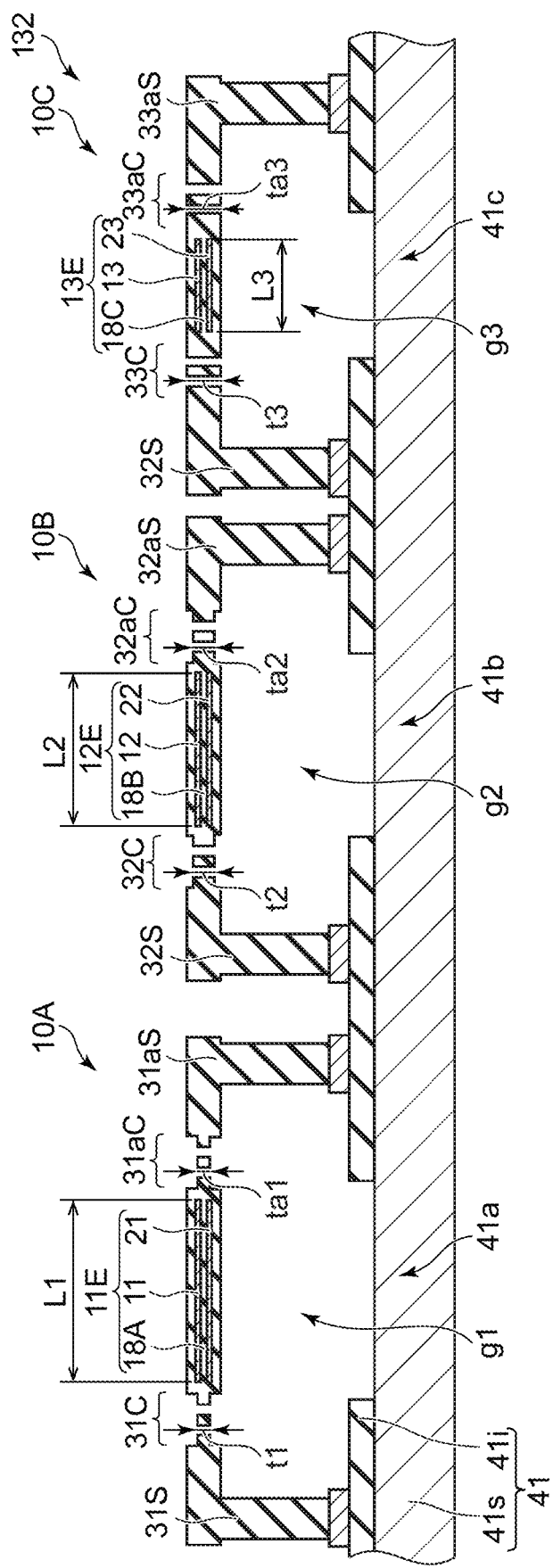
FIG. 15 is a schematic cross-sectional view illustrating a sensor according to the third embodiment.

FIGS. 14 and 15 are schematic cross-sectional views illustrating sensors according to the third embodiment.

As shown in FIGS. 14 and 15, a sensor 131 and a sensor 132 according to the embodiment further include a third detection unit 10C in addition to the first detection unit 10A and the second detection unit 10B. Except for this, the configuration of the sensor 131 and the sensor 132 may be the same as the configuration of the sensor according to the first embodiment or the second embodiment.

In the sensor 131 and the sensor 132, the third detection unit 10C includes the third detection element 13E, the third support portion 33S, and the third connect portion 33C. The third support portion 33S is fixed to the base 41. The third connect portion 33C is supported by the third support portion 33S and supports the third detection element 13E. A gap (for example, a third gap g3) is provided between the third base region 41c and the third connect portion 33C and between the third base region 41c and the third detection element 13E. The third detection element 13E includes the third resistance member 13 and the third conductive member 23.

In the sensor 131 and the sensor 132, the third connect portion 33C includes at least one of a third connect portion length LC3 different from the first connect portion length LC1 (see FIG. 6) and different from the second connect portion length LC2 (see FIG. 6), a third connect portion width w3 different from the first connect portion width w1 (see FIG. 6) and different from the second connect portion width w2 (see FIG. 6), a third connect portion thickness t3 different from the first connect portion thickness t1 (see FIG. 8) and different from the second connect portion thickness t2 (see FIG. 8), or a third connect portion material different from the first connect portion material and different from the second connect portion material. The third connect portion length LC3 is a length of the third connect portion 33C along the third connect portion path between the third support portion 33S and the third detection element 13E. The third connect portion width w3 is a width of the third connect portion 33C in a direction crossing the third connect portion path. The third connect portion thickness t3 is a thickness of the third connect portion 33C in the first direction (Z-axis direction).

For example, the thermal resistance in the third connect portion 33C is different from the thermal resistance in the first connect portion 31C, and is different from the thermal resistance in the second connect portion 32C.

In the sensor 131, the third connect portion length LC3 is different from the first connect portion length LC1 and different from the second connect portion length LC2. The third connect portion width w3 is different from the second connect portion width w2 unlike the first connect portion width w1. In the sensor 131, the third connect portion thickness t3 is different from the first connect portion thickness t1 and different from the second connect portion thickness t2.

In the sensors 131 and 132, the first other connect portion 31aC includes the first other connect portion length LCa1 (see FIG. 6), the first other connect portion width wa1 (see FIG. 6), and the first other connect portion thickness ta1 (see FIG. 8), and the first other connect portion material. The first other connect portion length LCa1 is the length of the first other connect portion 31aC along the first other connect portion path between the first other support portion 31aS and the first detection element 11E. The first other connect portion width wa1 is the width of the first other connect portion 31aC in the direction crossing the first other connect portion path. The first other connect portion thickness ta1 is the thickness of the first other connect portion 31aC in the first direction (Z-axis direction).

The second other connect portion 32aC includes at least one of the second other connect portion length LCa2 (see FIG. 6) different from the first other connect portion length LCa1, the second other connect portion width wag different from the first other connect portion width wa1 (see FIG. 6), the second other connect portion thickness ta2 different from the first other connect portion thickness ta1 (see FIG. 8), or the second other connect portion material different from the first other connect portion material. The second other connect portion length LCa2 is the length of the second other connect portion 32aC along the second other connect portion path between the second other support portion 32aS and the second detection element 12E. The second other connect portion width wa2 is the width of the second other connect portion 32aC in the direction crossing the second other connect portion path. The second other connect portion thickness ta2 is the thickness of the second other connect portion 32aC in the first direction (Z-axis direction).

In the sensor 131 and the sensor 132, the third other connect portion 33aC includes at least one of the third other connect portion length LCa3 different from the first other connect portion length LCa1 (see FIG. 6) and different from the second other connect portion length LCa2 (see FIG. 6), the third other connect portion width wa3 different from the other connect portion width wa1 (see FIG. 6) and the second other connect portion width wa2 (see FIG. 6), the third other connection part thickness ta3 different from the first other connect portion thickness ta1 (see FIG. 8) and different from the second other connection part thickness ta2 (see FIG. 8), the third other connect portion material different from the first other connect portion material and different from other connect portion material. The third other connect portion length LCa3 is the length of the third other connect portion 33aC along the third other connect portion path between the third other support portion 33aS and the third detection element 13E. The third other connect portion width wa3 is the width of the third other connect portion 33aC in the direction intersecting the third other connect portion path. The third other connect portion thickness ta3 is the thickness of the third other connect portion 33aC in the first direction (Z-axis direction).

For example, the thermal resistance of the third other connect portion 33aC is different from the thermal resistance of the first other connect portion 31aC, and is different from the thermal resistance of the second other connect portion 32aC. For example, by providing three or more detection elements having different heat dissipation characteristics, it is possible to detect a substance with high accuracy even when the types of substances (gas) included in the space increase.

As described above, in the embodiment, the space around the detection element may further contain a third substance in addition to the first substance and the second substance. For example, the third substance may contain at least one selected from the group consisting of nitrogen, air, carbon monoxide and oxygen. The first substance includes, for example, one selected from the group consisting of carbon dioxide, helium, methane, chlorine, sulfur hexafluoride (SF6) and hydrogen. The second substance includes, for example, another one selected from the group consisting of carbon dioxide, helium, methane, chlorine, sulfur hexafluoride (SF6) and hydrogen.

The thermal conductivity of these substances is different from each other. In the embodiment, characteristics based on a difference in heat dissipation characteristics due to a difference in thermal conductivity of a substance are detected.

For example, the thermal conductivity under one temperature condition is as follows. The thermal conductivity of carbon dioxide is 14.5 mW/(m·K). The thermal conductivity of helium is 144.2 mW/(m·K). The thermal conductivity of methane is 30.4 mW/(m·K). The thermal conductivity of hydrogen is 167.5 mW/(m·K). The thermal conductivity of nitrogen is 24.1 mW/(m·K). The thermal conductivity of carbon monoxide is 23.3 mW/(m·K).

The embodiment may include following configurations (for example, technical proposals).

Configuration 1

A sensor, comprising:
a base including a first base region and a second base region;
a first detection unit including a first detection element, the first detection element including a first resistance member, a first conductive member, and a first insulating member, at least a part of the first insulating member being between the first resistance member and the first conductive member, a first gap being provided between the first base region and the first detection element, the first detection element having a first area in a plane crossing a first direction from the first base region to the first detection element; and
a second detection unit including a second detection element, the second detection element including a second resistance member, a second conductive member, and a second insulating member, at least a part of the second insulating member being between the second resistance member and the second conductive member, a second gap being provided between the second base region and the second detection element, the second detection element having a second area in the plane, the second area being smaller than the first area.

Configuration 2

The sensor according to Configuration 1, wherein
the first detection element has a first length in a direction crossing the first direction, and
the second detection element has a second length in a direction crossing the first direction, and the second length is shorter than the first length.

Configuration 3

The sensor according to Configuration 1 or 2, wherein a first distance in the first direction between the first base region and the first detection element is different from a second distance in the first direction between the second base region and the second detection element.

Configuration 4

The sensor according to Configuration 3, wherein the first distance is longer than the second distance.

Configuration 5

The sensor according to Configuration 1 or 2, wherein
the first detection unit further includes a first support portion, and a first connect portion,
the first support portion is fixed to the base,
the first connect portion is supported by the first support portion and supports the first detection element,
a gap is provided between the first base region and the first connect portion,
the second detection unit further includes a second support portion, and a second connect portion,
the second support portion is fixed to the base,
the second connect portion is supported by the second support portion and supports the second detection element, and
a gap is provided between the second base region and the second connect portion.

Configuration 6

The sensor according to Configuration 5, wherein
the first detection unit further includes a first other support portion, and a first other connect portion,
the first other support portion is fixed to the base,
the first other connect portion is supported by the first other support portion and supports the first detection element,
a gap is provided between the first base region and the first other connect portion,
the second other detection unit further includes a second other support portion, and a second other connect portion,
the second other support portion is fixed to the base,
the second other connect portion is supported by the second other support portion and supports the second detection element, and
a gap is provided between the second base region and the second other connect portion.

Configuration 7

The sensor according to Configuration 6, wherein
the first other connect portion includes a first other connect portion length, a first other connect portion width, a first other connect portion thickness, and a first other connect portion material,
the first other connect portion length is a length of the first other connect portion along a first other connect portion path between the first other support portion and the first detection element,
the first other connect portion width is a width of the first other connect portion in a direction crossing the first other connect portion path,
the first other connect portion thickness is a thickness of the first other connect portion in the first direction,
the second other connect portion includes at least one of a second other connect portion length different from the first other connect portion length, a second other connect portion width different from the first other connect portion width, a second other connect portion thickness different from the first other connect portion thickness, or a second other connect portion material different from the first other connect portion material,
the second other connect portion length is a length of the second other connect portion along a second other connect portion path between the second other support portion and the second detection element, the second other connect portion width is a width of the second other connect portion in a direction crossing the second other connect portion path, and the second other connect portion thickness is a thickness of the second other connect portion in the first direction.

Configuration 8

The sensor according to one of Configurations 5-7, wherein the first connect portion includes a first connect portion length, a first connect portion width, a first connect portion thickness, and a first connect portion material, the first connect portion length is a length of the first connect portion along a first connect portion path between the first support portion and the first detection element, the first connect portion width is a width of the first connect portion in a direction crossing the first connect portion path, the first connect portion thickness is a thickness of the first connect portion in the first direction, the second connect portion includes at least one of a second connect portion length different from the first connect portion length, a second connect portion width different from the first connect portion width, a second connect portion thickness different from the first connect portion thickness, or a second connect portion material different from the first connect portion material, the second connect portion length is a length of the second connect portion along a second connect portion path between the second support portion and the second detection element, the second connect portion width is a width of the second connect portion in a direction crossing the second connect portion path, and the second connect portion thickness is a thickness of the second connect portion in the first direction.

Configuration 9

The sensor according to Configuration 8, wherein the second connect portion includes at least one of the second connect portion length shorter than the first connect portion length, the second connect portion width greater than the first connect portion width, the second connect portion thickness thicker than the first connect portion thickness.

Configuration 10

The sensor according to Configuration 8 or 9, wherein a thermal conductivity of the second connect portion material is higher than a thermal conductivity of the first connect portion material.

Configuration 11

The sensor according to Configurations 1-20, further comprising a third detection unit, the base further including a third base region, the third detection unit including a third detection element, the third detection element including a third resistance member, a third conductive member, and a third insulating member, at least a part of the third insulating member being between the third resistance member and the third conductive member, a third gap being provided between the third base region and the third detection element, the third detection element having a third area in the plane, the third area being different from the first area and different from the second area.

Configuration 12

A sensor, comprising:

a base including a first base region and a second base region;

a first detection unit including a first detection element, a first support portion, and a first connect portion, the first support portion being fixed to the base, the first connect portion being supported by the first support portion and supporting the first detection element, a gap being provided between the first base region and the first connect portion, the first detection element including a first resistance member and a first conductive member;

a second detection unit including a second detection element, a second support portion, and a second connect portion, the second support portion being fixed to the base, the second connect portion being supported by the second support portion and supporting the second detection element, a gap being provided between the second base region and the second connect portion, the second detection element including a second resistance member and a second conductive member;

the first connect portion including a first connect portion length, a first connect portion width, a first connect portion thickness, and a first connect portion material, the first connect portion length being a length of the first connect portion along a first connect portion path between the first support portion and the first detection element, the first connect portion width being a width of the first connect portion in a direction crossing the first connect portion path, the first connect portion thickness being a thickness of the first connect portion in a first direction from the first base region to the first detection element, the second connect portion including at least one of a second connect portion length different from the first connect portion length, a second connect portion width different from the first connect portion width, a second connect portion thickness different from the first connect portion thickness, or a second connect portion material different from the first connect portion material, the second connect portion length being a length of the second connect portion along a second connect portion path between the second support portion and the second detection element, the second connect portion width being a width of the second connect portion in a direction crossing the second connect portion path, and the second connect portion thickness being a thickness of the second connect portion in the first direction.

Configuration 13

The sensor according to Configuration 12, wherein the first detection unit further includes a first other support portion, and a first other connect portion, the first other support portion is fixed to the base, the first other connect portion is supported by the first other support portion and supports the first detection element, a gap is provided between the first base region and the first other connect portion, the second other detection unit further includes a second other support portion, and a second other connect portion, the second other support portion is fixed to the base, the second other connect portion is supported by the second other support portion and supports the second detection element, and a gap is provided between the second base region and the second other connect portion, the first other connect portion includes a first other connect portion length, a first other connect portion width, a first other connect portion thickness, and a first other connect portion material, the first other connect portion length is a length of the first other connect portion along a first other connect portion path between the first other support portion and the first detection element, the first other connect portion width is a width of the first other connect portion in a direction crossing the first other connect portion path, the first other connect portion thickness is a thickness of the first other connect portion in the first direction, the second other connect portion includes at least one of a second other connect portion length different from the first other connect portion length, a second other connect portion width different from the first other connect portion width, a second other connect portion thickness different from the first other connect portion thickness, or a second other connect portion material different from the first other connect portion material, the second other connect portion length is a length of the second other connect portion along a second other connect portion between the second other support portion and the second detection element, the second other connect portion width is a width of the second other connect portion in a direction crossing the second other connect portion path, and the second other connect portion thickness is a thickness of the second other connect portion in the first direction.

Configuration 14

The sensor according to Configuration 12 or 13, further comprising a third detection unit, the base further including a third base region, the third detection unit including a third detection element, a third support portion, and a third connect portion, the third support portion being fixed to the base, the third connect portion being supported by the third support portion and supporting the third detection element, a gap being provided between the third base region and the third connect portion, the third detection element including a third resistance member and a third conductive member;

the third connect portion including at least one of a third connect portion length different from the first connect portion length and different from the second connect portion length, a third connect portion width different from the first connect portion width and different from the second connect portion width, a third connect portion thickness different from the first connect portion thickness and different from the second connect portion thickness, or a third connect portion material different from the first connect portion material and different from the second connect portion material, the third connect portion length being a length of the third connect portion along a third connect portion path between the third support portion and the third detection element, the third connect portion width being a width of the third connect portion in a direction crossing the third connect portion path, and the third connect portion thickness being a thickness of the third connect portion in the first direction.

Configuration 15

The sensor according to Configurations 1-14, further comprising a controller configured to be electrically connected with the first resistance member, the first conductive member, the second resistance member, and the second conductive member, the controller being configured to perform a first operation, in the first operation, the controller supplies a first current to the first conductive member to raise the temperature of the first detection element, in the first operation, the controller supplies a second current to the second conductive member to raise the temperature of the second detection element, in the first operation, the controller derives a first value corresponding to a first electric resistance of the first resistance member, in the first operation, the controller derives a second value corresponding to a second electric resistance of the second resistance member, in the first operation, the controller being configured to output a detection signal including a first detection value and a second detection value based on the first value and the second value, the first detection value corresponding to a concentration of a first substance included in a space around the first detection element and the second detection element, the second detection value corresponding to a concentration of a second substance included in the space.

Configuration 16

The sensor according to Configuration 15, wherein the controller is configured to derive the first detected value and the second detected value based on a first information and a second information, the first information relates to a relationship between a concentration of the first substance and the first value for the first detection element, and a relationship between a concentration of the second substance and the first value for the first detection element, and the second information relates to a relationship between a concentration of the first substance and the second value for the second detection element, and a relationship between a concentration of the second substance and the second value for second detection element.

Configuration 17

The sensor according to Configuration 15 or 16, wherein the controller includes a storage and a processor, the storage is configured to store the first information and the second information, and the processor is configured to read the first information and the second information from the storage unit, and is configured to output a detection signal including the first detection value and the second detection value based on the first information being read, the second information being read, the first value and the second value.

Configuration 18

The sensor according to one of Configurations 15-17, further comprising a resistance element provided at the base,
the controller unit including a differential circuit,
the differential circuit being configured to derive the first value based on a difference between a potential corresponding to an electric resistance of the resistance element and a potential corresponding to the first electric resistance of the first resistance member, and
the differential circuit being configured to derive the second value based on a difference between a potential corresponding to the electric resistance of the resistance element and a potential corresponding to the second electric resistance of the second resistance member.

Configuration 19

The sensor according to one of Configurations 15-18, wherein
the space further includes a third substance, and
the third substance includes at least one selected from the group consisting of nitrogen, air, carbon monoxide, and oxygen.

Configuration 20

The sensor according to one of Configurations 15-19, wherein
the first substance includes one selected from the group consisting of carbon dioxide, helium, methane, chlorine, sulfur hexafluoride and hydrogen, and
the second substance includes another one selected from the group consisting of carbon dioxide, helium, methane, chlorine, sulfur hexafluoride and hydrogen.

In the embodiment, the first substance may include one selected from the group consisting of carbon dioxide, helium, methane, chlorine, sulfur hexafluoride, hydrogen, ammonia and ethylene. In embodiments, the second substance may include another one selected from the group consisting of carbon dioxide, helium, methane, chlorine, sulfur hexafluoride, hydrogen, ammonia, ethylene, and water. The second substance may include, for example, water vapor.

Fourth Embodiment

Figure 16:
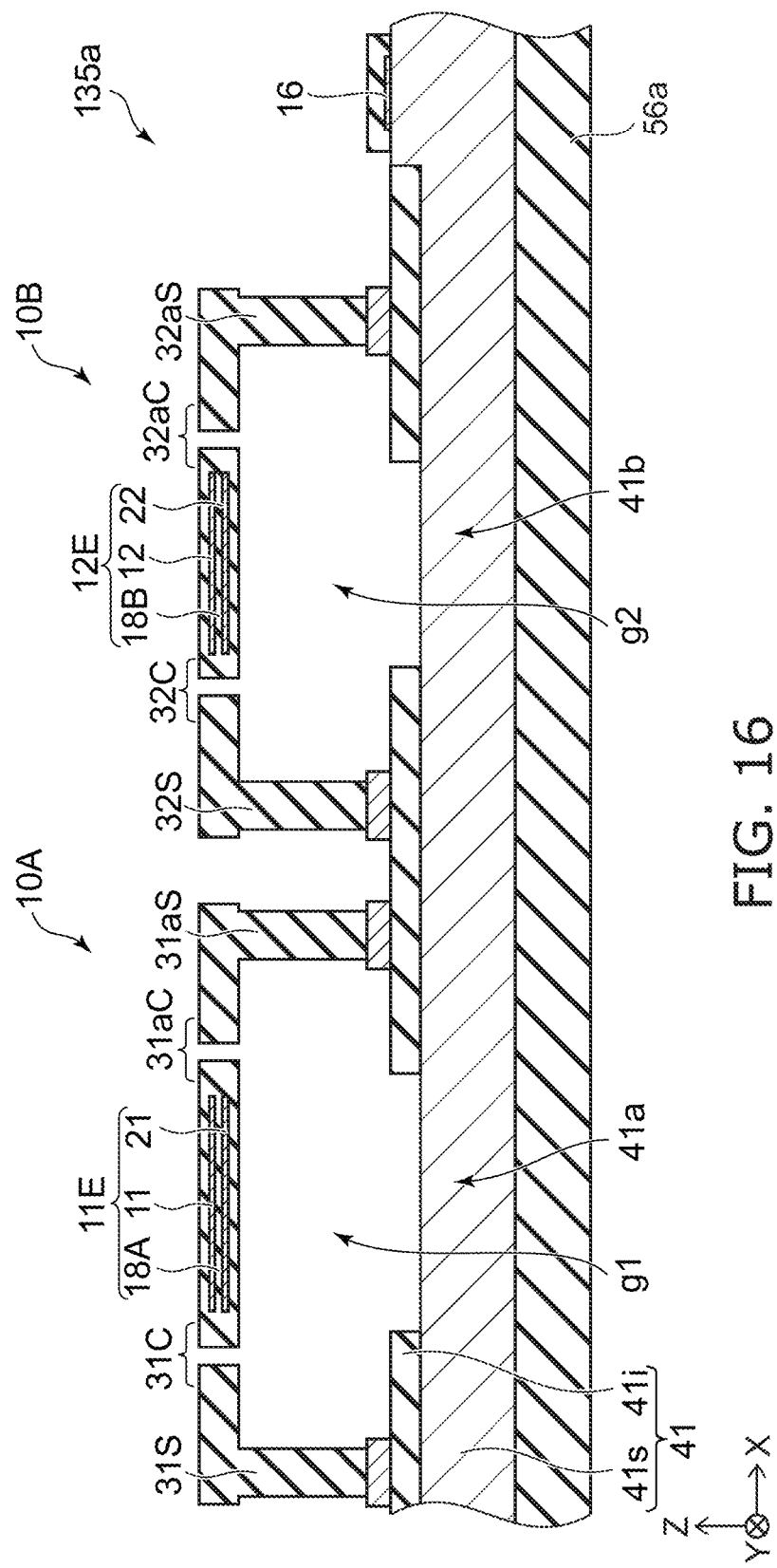
FIG. 16 is a schematic cross-sectional view illustrating the sensor according to a fourth embodiment.

FIG. 16 is a schematic cross-sectional view illustrating the sensor according to the fourth embodiment.

As shown in FIG. 16, the sensor 135a according to the embodiment includes a first mounting member 56a. Other configurations of the sensor 135a may be the same as the configurations of any of the sensors according to the first to third embodiments. As shown in FIG. 16, in the sensor 135a, the base 41 is fixed to the first mounting member 56a. The first mounting member 56a may be, for example, a printed circuit board.

Figure 17:
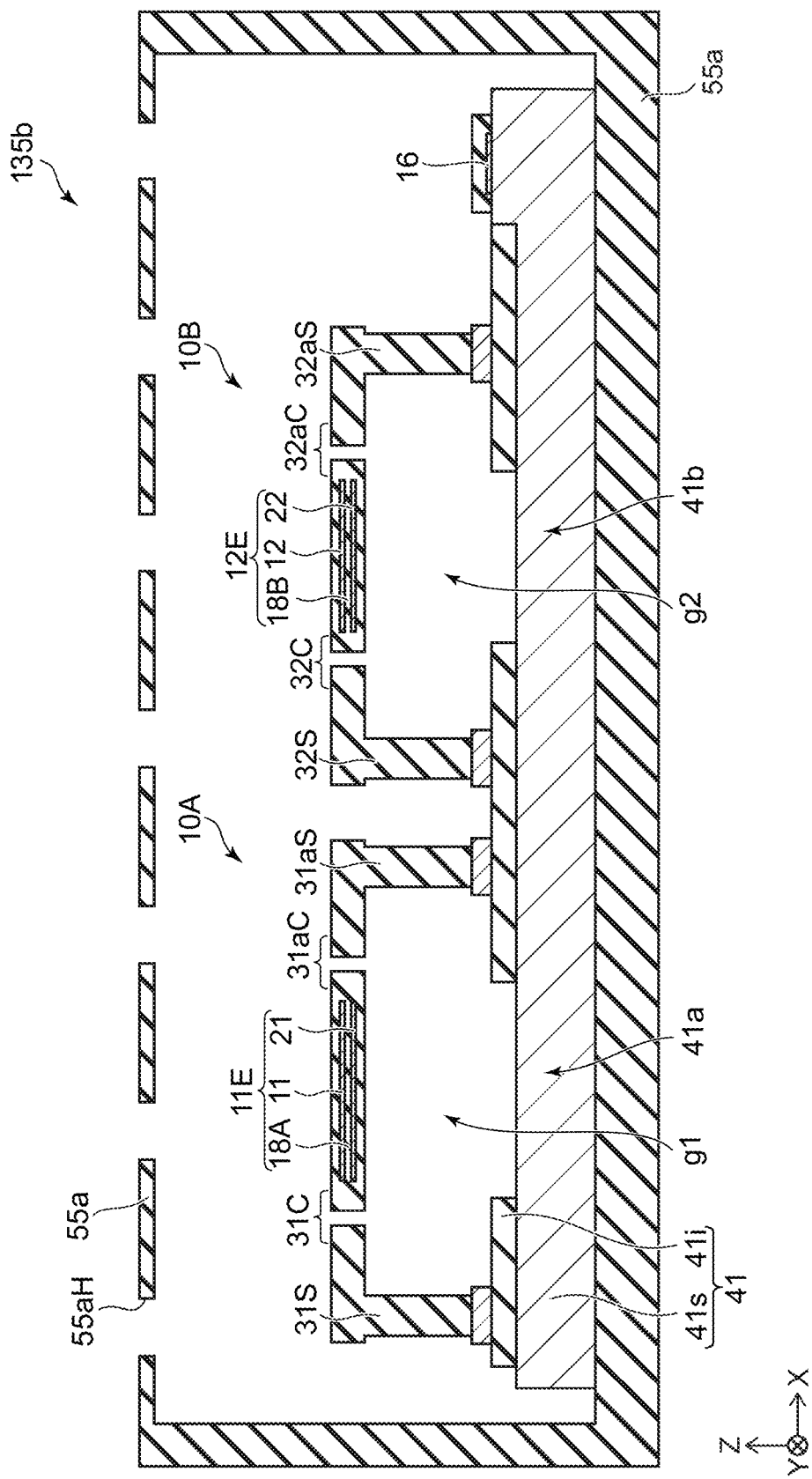
FIG. 17 is a schematic cross-sectional view illustrating the sensor according to the fourth embodiment.

FIG. 17 is a schematic cross-sectional view illustrating the sensor according to the fourth embodiment.

As shown in FIG. 17, a sensor 135b according to the embodiment includes a first housing 55a. The first housing 55a is, for example, a package. Other configurations of the sensor 135b may be the same as the configurations of any of the sensors according to the first to third embodiments. As shown in FIG. 17, in the sensor 135b, the base 41, the first detection unit 10A, and the second detection unit 10B are provided between a plurality of portions of the first housing 55a. The plurality of portions are, for example, a bottom portion of the first housing 55a and a lid portion of the first housing 55a.

As shown in FIG. 17, a hole 55aH is provided in a part (for example, the lid portion) of the first housing 55a. A plurality of holes 55aH may be provided. The hole 55aH serves as an inlet or an outlet for the substance (gas or the like) to be detected.

Figure 18A:
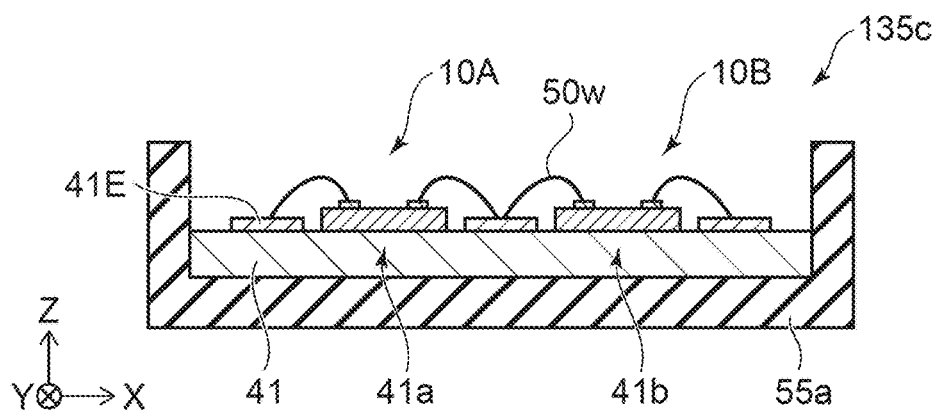
FIGS. 18A to 18C are schematic cross-sectional views illustrating the sensor according to the fourth embodiment.
Figure 18B:
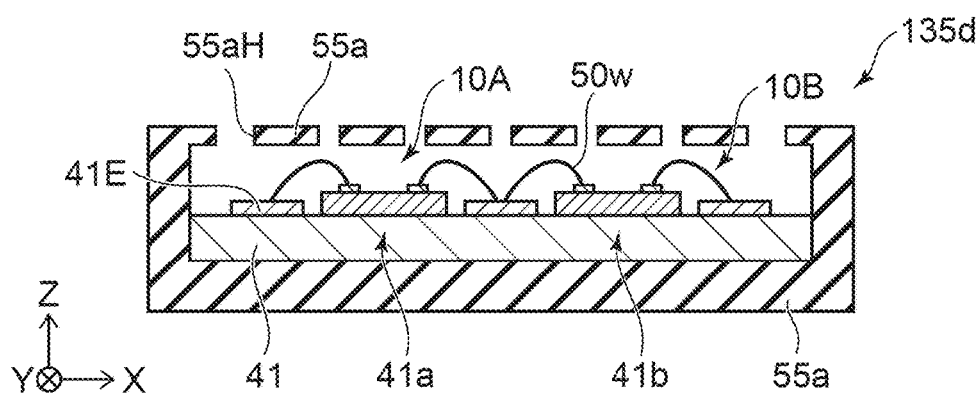
Figure 18C:
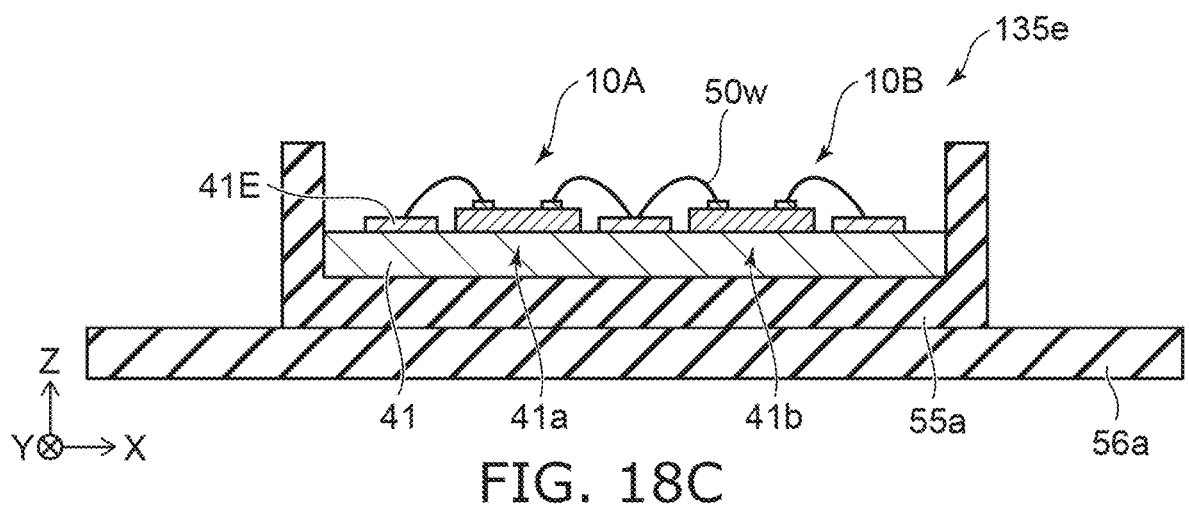

FIGS. 18A to 18C are schematic cross-sectional views illustrating the sensor according to the fourth embodiment.

In a sensor 135c according to the embodiment shown in FIG. 18A, a structure body including the base 41, the first detection unit 10A, and the second detection unit 10B is fixed to the bottom of the first housing 55a. For example, a terminal included in the first detection unit 10A and a terminal included in the second detection unit 10B are connected to the electrode 41E provided on the base 41 by a connecting member (for example, a bonding wire 50w or the like). Except for this, the configuration of the sensor 135c may be the same as the configuration of any sensor according to the first to third embodiments.

In a sensor 135d according to the embodiment shown in FIG. 18B, a hole 55aH is provided in a portion (for example, the lid portion) of the first housing 55a. A plurality of holes 55aH may be provided. Except for this, the configuration of the sensor 135d may be the same as the configuration of the sensor 135c.

In a sensor 135e according to the embodiment shown in FIG. 18C, the first housing 55a is fixed to the first mounting member 56a. Except for this, the configuration of the sensor 135e may be the same as the configuration of the sensor 135c or the configuration of the sensor 135d.

In the above sensors 135a to 135e, a plurality of detection units (first detection unit 10A, second detection unit 10B, etc.) are provided on one base 41. The plurality of base regions (first base region 41a, second base region 41b, etc.) in the base 41 may be continuous with each other. The first detection unit 10A and the second detection unit 10B may be produced simultaneously in one process. It is easy to control the thermal characteristics (for example, thermal resistance or thermal conductivity) among a plurality of detectors with high accuracy. It is easy to obtain detection results with higher accuracy.

Fifth Embodiment

In a fifth embodiment, a base is provided in each of the first detection unit 10A and the second detection unit 10B.

Figure 19:
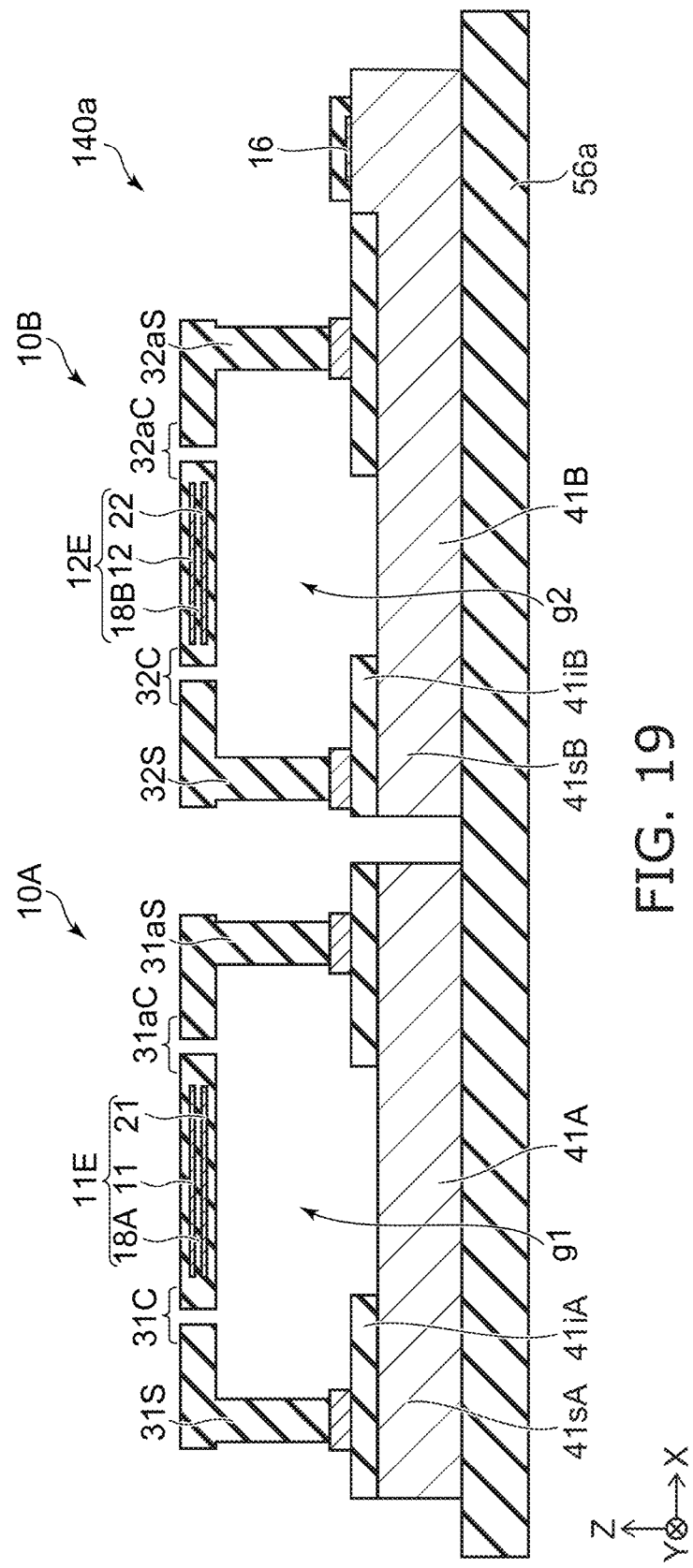
FIG. 19 is a schematic cross-sectional view illustrating the sensor according to a fifth embodiment.

FIG. 19 is a schematic cross-sectional view illustrating the sensor according to the fifth embodiment.

As shown in FIG. 19, a sensor 140a according to the embodiment includes a first detection unit 10A and a second detection unit 10B.

The first detection unit 10A includes the first base 41A, the first support portion 31S, the first connect portion 31C, and the first detection element 11E. The position of the first support portion 31S with respect to the first base 41A is fixed. For example, the first support portion 31S may be fixed to the first base 41A. The first connect portion 31C is supported by the first support portion 31S. The first connect portion 31C supports the first detection element 11E. The first gap g1 is provided between the first base 41A and the first detection element 11E.

As described with respect to the first embodiment and the second embodiment, the first detection unit 10A includes the first area S1 of the first detection element 11E, the first connect portion length LC1 of the first connect portion 31C, the first connect portion width w1 of the first connect portion 31C, the first connect portion thickness t1 of the first connect portion 31C, the first connect portion material of the first connect portion 31C, and the first distance d1 between the first base region 41a and the first detection element 11E.

The second detection unit 10B includes the second base 41B, the second support portion 32S, the second connect portion 32C, and the second detection element 12E. The position of the second support portion 32S with respect to the second base 41B is fixed. For example, the second support portion 32S may be fixed to the second base 41B. The second connect portion 32C is supported by the second support portion 32S. The second connect portion 32C supports the second detection element 12E. The second gap g2 is provided between the second base 41B and the second detection element 12E.

As described with respect to the first embodiment and the second embodiment, the second detection unit 10B includes at least one of a second area S2 of the second detection element 12E being different from the first area S1, a second connect portion length LC2 of the second connect portion 32C being different from the first connect portion length LC1, a second connect portion width w2 of the second connect portion 32C being different from the first connect portion width w1, a second connect portion thickness t2 of the second connect portion 32C being different from the first connect portion thickness t1, a second connect portion material of the second connect portion 32C being different from the first connect portion material, or a second distance d2 being different from the first distance d1. The second distance d2 is a distance between the second base region 41b and the second detection element 12E.

Also in the fifth embodiment, it is possible to detect the concentration of the substance to be detected with higher accuracy. According to the embodiment, it is possible to provide a sensor whose characteristics can be improved.

The first base 41A includes, for example, a substrate 41sA and an insulating film 41iA. The substrate 41sA may be, for example, a semiconductor substrate (for example, a silicon substrate). The substrate 41sA may include, for example, a semiconductor circuit or the like. The substrate 41sA may include a connecting member such as a via electrode. The substrate 41sA is optional.

The second base 41B includes, for example, a substrate 41sB and an insulating film 41iB. The substrate 41sB may be, for example, a semiconductor substrate (for example, a silicon substrate). The substrate 41sB may include, for example, a semiconductor circuit or the like. The substrate 41sB may include a connecting member such as a via electrode. The substrate 41sB is optional.

Figure 20:
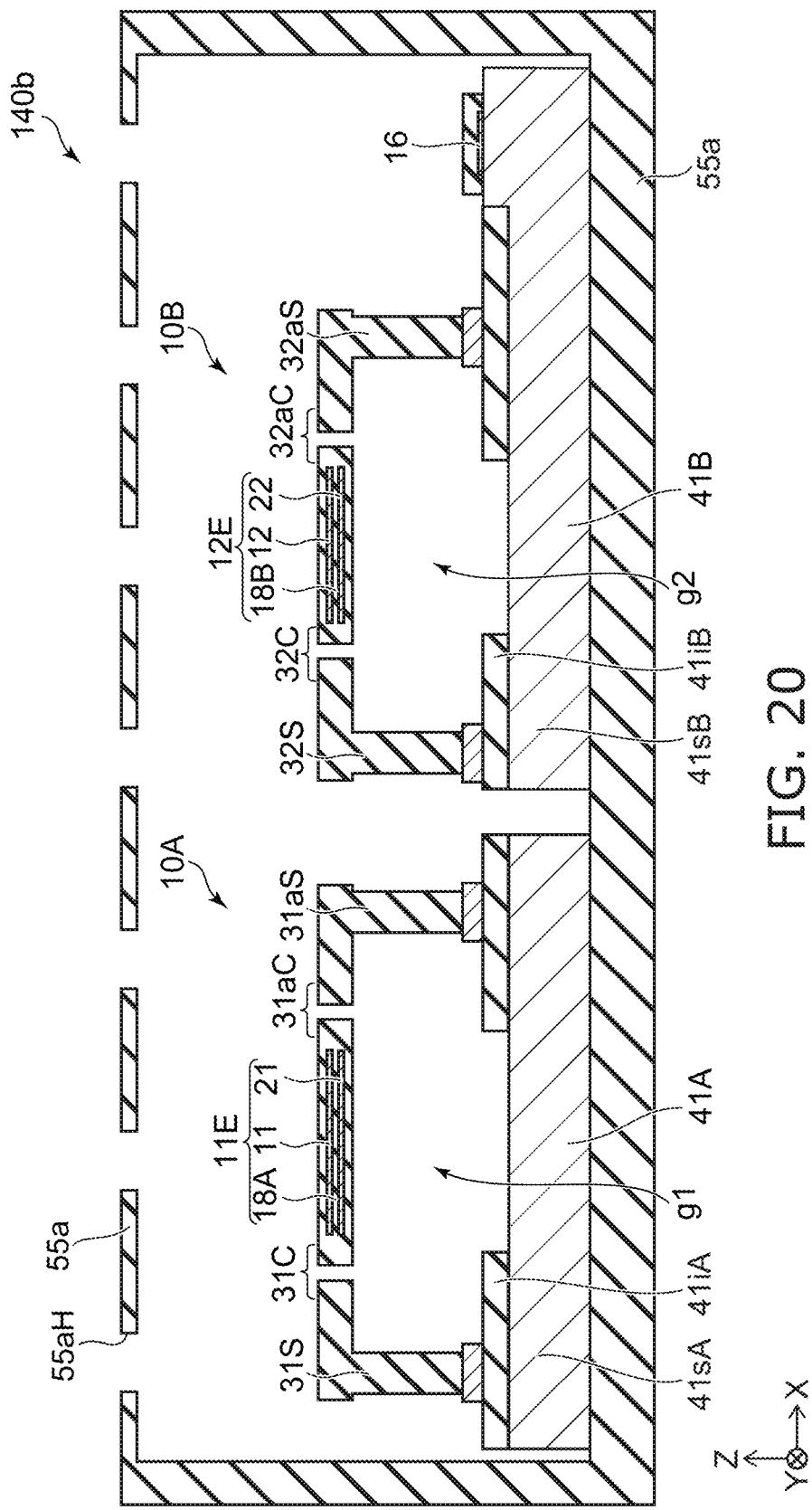
FIG. 20 is a schematic cross-sectional view illustrating the sensor according to the fifth embodiment.

FIG. 20 is a schematic cross-sectional view illustrating the sensor according to the fifth embodiment.

As shown in FIG. 20, a sensor 140b according to the embodiment includes the first housing 55a. The first housing 55a is, for example, a package. Other configurations of the sensor 140b may be the same as the configuration of the sensor 140a. As shown in FIG. 20, in the sensor 140b, the first detection unit 10A and the second detection unit 10B are provided between a plurality of portions of the first housing 55a. The plurality of portions are, for example, a bottom portion of the first housing 55a and a lid portion of the first housing 55a. As shown in FIG. 20, a hole 55aH is provided in a portion (for example, the lid portion) of the first housing 55a. A plurality of holes 55aH may be provided. The hole 55aH serves as an inlet or an outlet for the substance (gas or the like) to be detected.

Figure 21A:
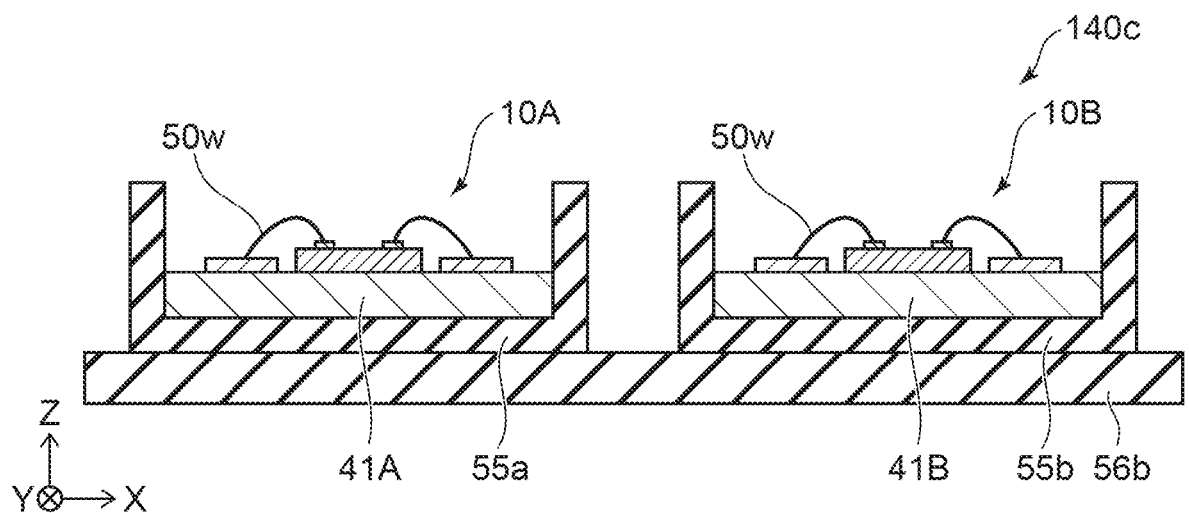
FIGS. 21A and 21B are schematic cross-sectional views illustrating the sensor according to the fifth embodiment.
Figure 21B:
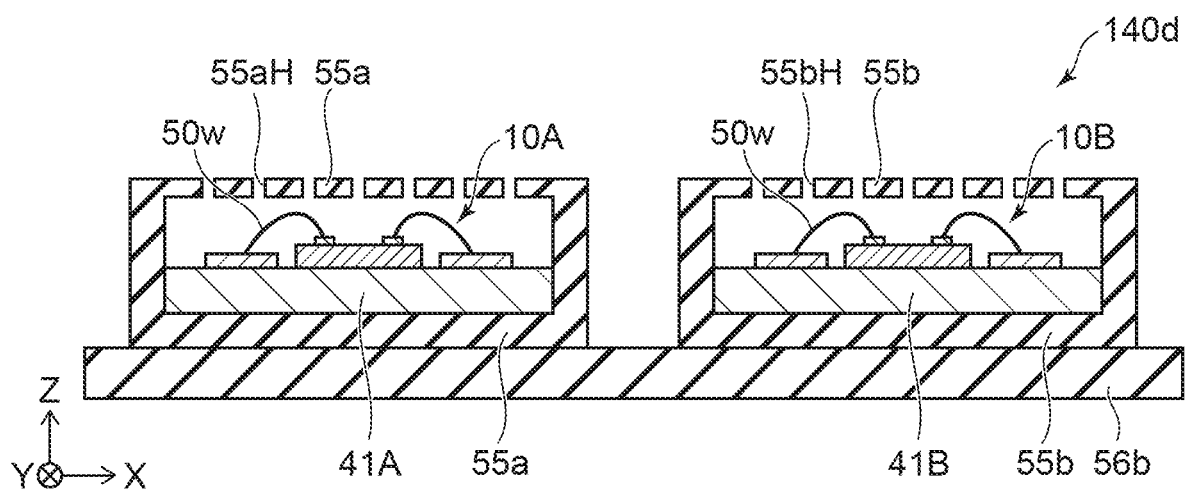

FIGS. 21A and 21B are schematic cross-sectional views illustrating the sensor according to the fifth embodiment.

In a sensor 140c according to the embodiment shown in FIG. 21A, a first housing 55a and a second housing 55b are provided. The first detection unit 10A is fixed to the first housing 55a. The second detection unit 10B is fixed to the second housing 55b. The first housing 55a and the second housing 55b are fixed to the first mounting member 56a.

In a sensor 140d according to the embodiment shown in FIG. 21B, the first detection unit 10A is provided between a plurality of portions of the first housing 55a. The plurality of portions are, for example, a bottom portion of the first housing 55a and a lid portion of the first housing 55a. As shown in FIG. 21B, a hole 55aH is provided in a portion (for example, the lid portion) of the first housing 55a. A plurality of holes 55aH may be provided. The hole 55aH serves as an inlet or an outlet for the substance (gas or the like) to be detected.

As shown in FIG. 21B, in the sensor 140d, the second detection unit 10B is provided between a plurality of portions of the second housing 55b. The plurality of portions are, for example, a bottom portion of the second housing 55b and a lid portion of the second housing 55b. As shown in FIG. 21B, a hole 55bH is provided in a portion (for example, the lid portion) of the second housing 55b. A plurality of holes 55bH may be provided. The hole 55bH serves as an inlet or an outlet for the substance (gas or the like) to be detected.

Figure 22A:
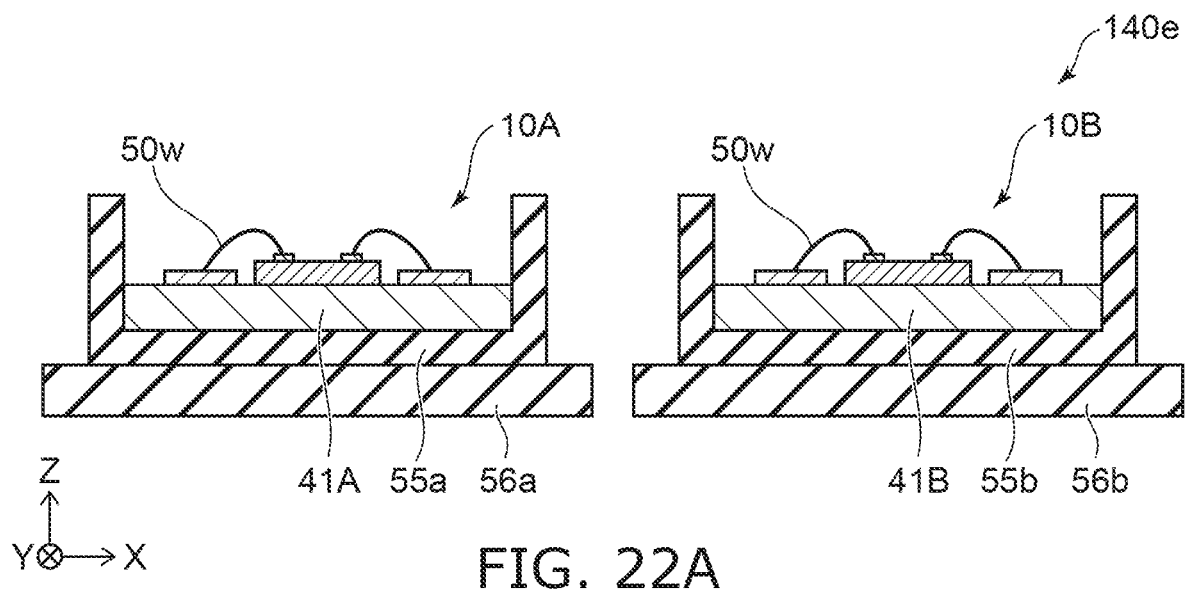
FIGS. 22A and 22B are schematic cross-sectional views illustrating the sensor according to the fifth embodiment.
Figure 22B:
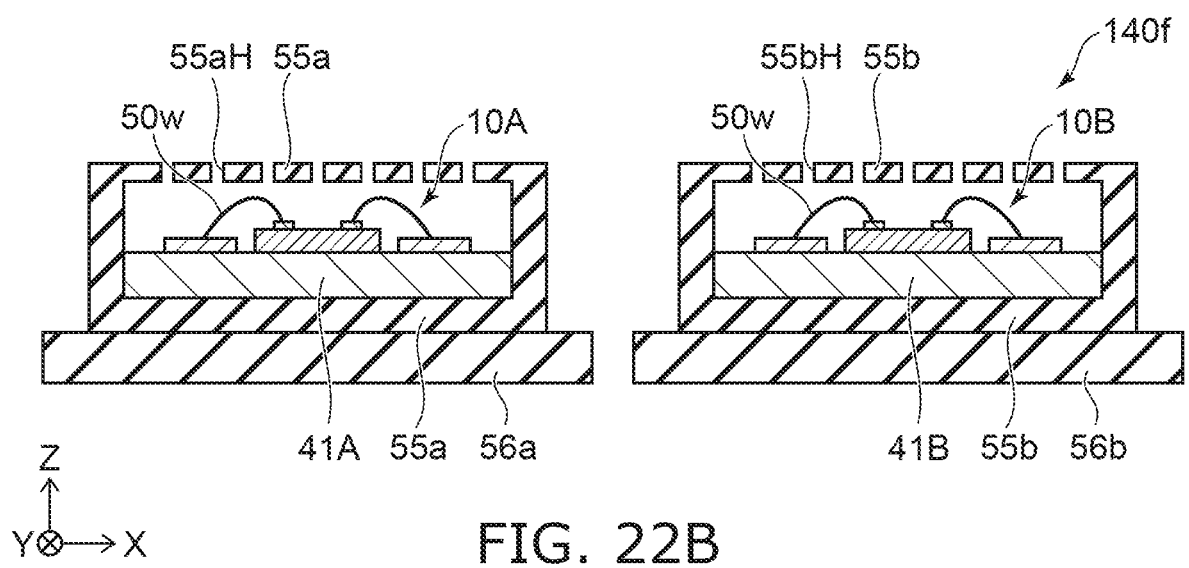

FIGS. 22A and 22B are schematic cross-sectional views illustrating the sensor according to the fifth embodiment.

In a sensor 140e according to the embodiment shown in FIG. 22A, the first mounting member 56a and the second mounting member 56b are provided. The first detection unit 10A is fixed to the first housing 55a. The second detection unit 10B is fixed to the second housing 55b. The first housing 55a is fixed to the first mounting member 56a. The second housing 55b is fixed to the second mounting member 56b.

In a sensor 140f according to the embodiment shown in FIG. 22B, the first detection unit 10A is provided between a plurality of portion of the first housing 55a. The plurality of portions are, for example, a bottom portion of the first housing 55a and a lid portion of the first housing 55a. As shown in FIG. 22B, a hole 55aH may be provided in a portion (for example, the lid portion) of the first housing 55a. A plurality of holes 55aH may be provided.

As shown in FIG. 22B, in a sensor 140f, the second detection unit 10B is provided between a plurality of portions of the second housing 55b. The plurality of portions are, for example, a bottom portion of the second housing 55b and a lid portion of the second housing 55b. As shown in FIG. 22B, a hole 55bH may be provided in a portion (for example, the lid portion) of the second housing 55b. A plurality of holes 55bH may be provided.

Figure 23A:
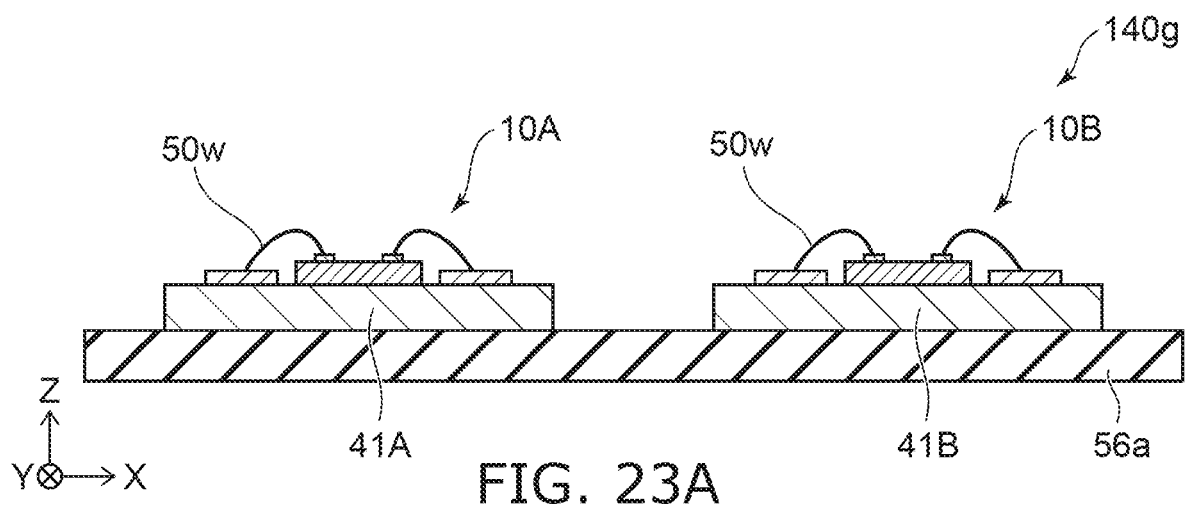
FIGS. 23A and 23B are schematic cross-sectional views illustrating the sensor according to the fifth embodiment.
Figure 23B:
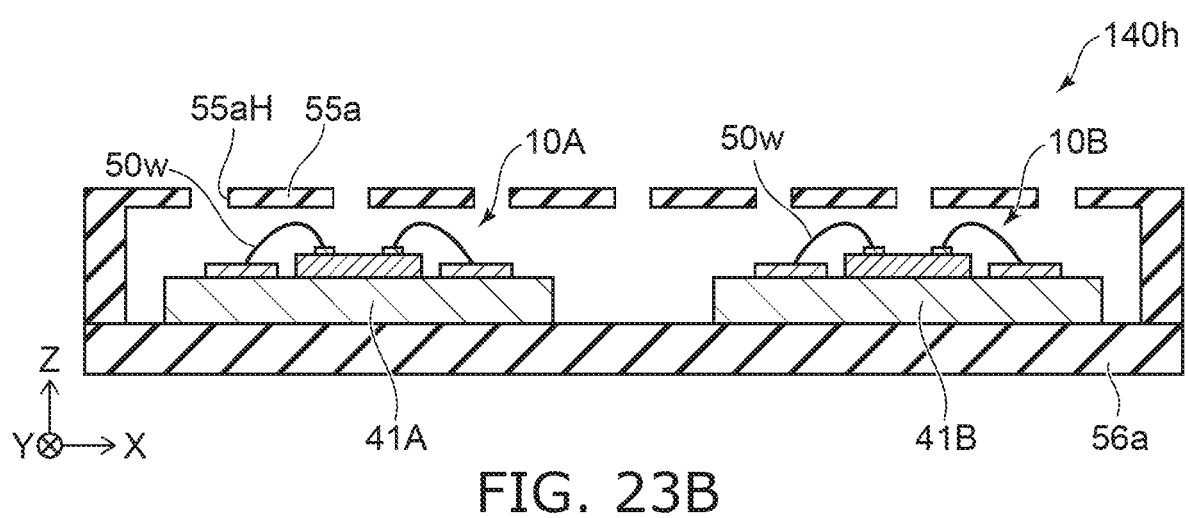

FIGS. 23A and 23B are schematic cross-sectional views illustrating the sensor according to the fifth embodiment.

In a sensor 140g according to the embodiment shown in FIG. 23A, the first base 41A and the second base 41B are fixed to the first mounting member 56a.

In a sensor 140h according to the embodiment shown in FIG. 23B, the first detection unit 10A and the second detection unit 10B are provided between the first mounting member 56a and the first housing 55a.

Figure 24A:
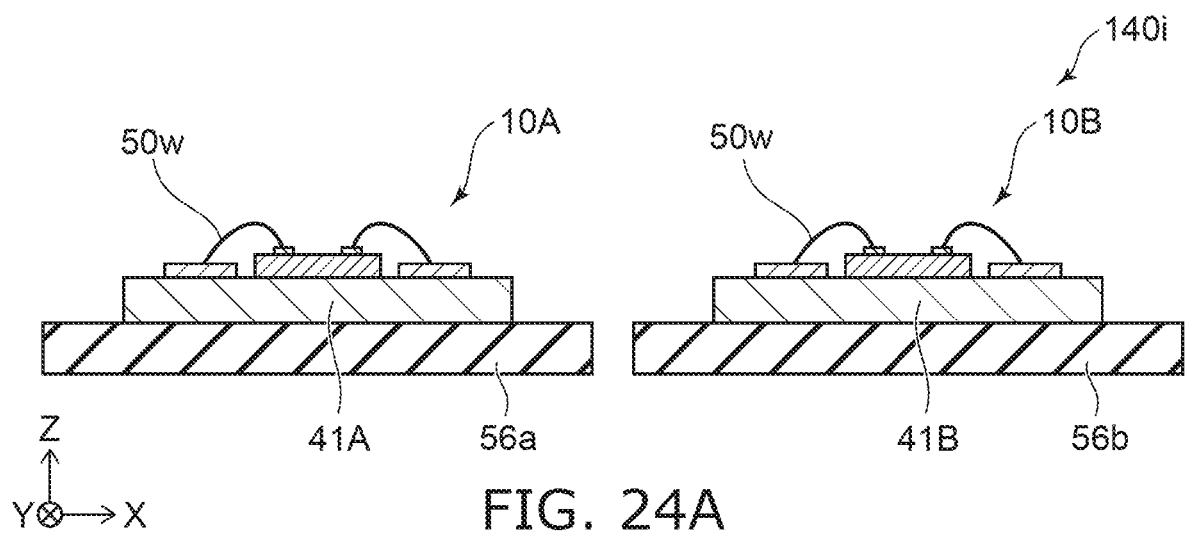
FIGS. 24A and 24B are schematic cross-sectional views illustrating the sensor according to the fifth embodiment.
Figure 24B:
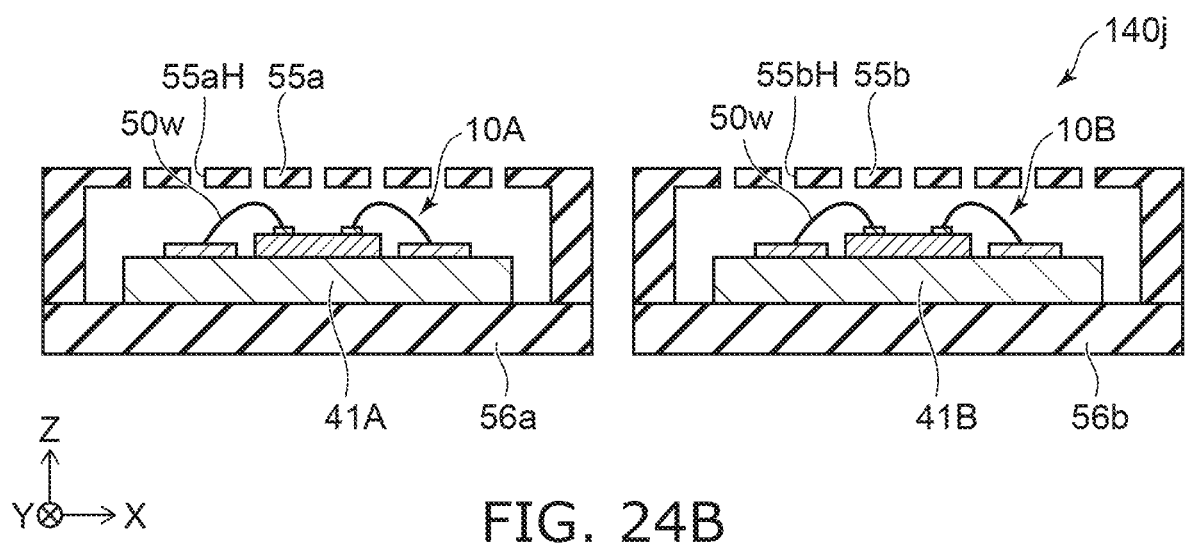

FIGS. 24A and 24B are schematic cross-sectional views illustrating the sensor according to the fifth embodiment.

In a sensor 140i according to the embodiment shown in FIG. 24A, the first base 41A is fixed to the first mounting member 56a. The second base 41B is fixed to the second mounting member 56b.

In a sensor 140j according to the embodiment shown in FIG. 24B, the first detection unit 10A is provided between the first mounting member 56a and the first housing 55a.

The second detection unit 10B is provided between the second mounting member 56b and the second housing 55b.

In the above sensors 140a to 140j, the configurations described with respect to the embodiment or the second embodiment can be applied to the configurations of the first support portion 31S, the first connect portion 31C, the first detection element 11E, the second support portion 32S, the second connect portion 32C, and the second detection element 12E.

The sensors 135a to 135e and the sensors 140a to 140j may be provided with three or more detection units. The three or more detection units may include, for example, the first detection unit 10A, the second detection unit 10B, the third detection unit 10C, and the like. At least one of third housing and third mounting member may be applied to the third detection unit 10C. At least one of the configurations of the first housing 55a and the second housing 55b may be applied to the third housing. At least one of the configurations of the first mounting member 56a and the second mounting member 56b may be applied to the third mounting member.

According to the embodiments, it is possible to provide a sensor whose characteristics can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as bases, detection units, controller, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
    a base including a first base region and a second base region;
    a first detection unit including a first detection element, the first detection element including a first resistance member, a first conductive member, and a first insulating member, at least a part of the first insulating member being between the first resistance member and the first conductive member, a first gap being provided between the first base region and the first detection element, the first detection element having a first area in a plane crossing a first direction from the first base region to the first detection element; and
    a second detection unit including a second detection element, the second detection element including a second resistance member, a second conductive member, and a second insulating member, at least a part of the second insulating member being between the second resistance member and the second conductive member, a second gap being provided between the second base region and the second detection element, the second detection element having a second area in the plane, the second area being smaller than the first area.

2. The sensor according to claim 1, wherein
    the first detection element has a first length in a direction crossing the first direction, and
    the second detection element has a second length in a direction crossing the first direction, and the second length is shorter than the first length.

3. The sensor according to claim 1, wherein a first distance in the first direction between the first base region and the first detection element is different from a second distance in the first direction between the second base region and the second detection element.

4. The sensor according to claim 3, wherein the first distance is longer than the second distance.

5. The sensor according to claim 1, wherein
    the first detection unit further includes a first support portion, and a first connect portion,
    the first support portion is fixed to the base,
    the first connect portion is supported by the first support portion and supports the first detection element,
    a gap is provided between the first base region and the first connect portion,
    the second detection unit further includes a second support portion, and a second connect portion,
    the second support portion is fixed to the base,
    the second connect portion is supported by the second support portion and supports the second detection element, and
    a gap is provided between the second base region and the second connect portion.

6. The sensor according to claim 5, wherein
    the first detection unit further includes a first other support portion, and a first other connect portion,
    the first other support portion is fixed to the base,
    the first other connect portion is supported by the first other support portion and supports the first detection element,
    a gap is provided between the first base region and the first other connect portion,
    the second other detection unit further includes a second other support portion, and a second other connect portion,
    the second other support portion is fixed to the base,
    the second other connect portion is supported by the second other support portion and supports the second detection element, and
    a gap is provided between the second base region and the second other connect portion.

7. The sensor according to claim 6, wherein
    the first other connect portion includes a first other connect portion length, a first other connect portion width, a first other connect portion thickness, and a first other connect portion material, the first other connect portion length is a length of the first other connect portion along a first other connect portion path between the first other support portion and the first detection element, the first other connect portion width is a width of the first other connect portion in a direction crossing the first other connect portion path, the first other connect portion thickness is a thickness of the first other connect portion in the first direction, the second other connect portion includes at least one of a second other connect portion length different from the first other connect portion length, a second other connect portion width different from the first other connect portion width, a second other connect portion thickness different from the first other connect portion thickness, or a second other connect portion material different from the first other connect portion material, the second other connect portion length is a length of the second other connect portion along a second other connect portion path between the second other support portion and the second detection element, the second other connect portion width is a width of the second other connect portion in a direction crossing the second other connect portion path, and the second other connect portion thickness is a thickness of the second other connect portion in the first direction.

8. The sensor according to claim 5, wherein the first connect portion includes a first connect portion length, a first connect portion width, a first connect portion thickness, and a first connect portion material, the first connect portion length is a length of the first connect portion along a first connect portion path between the first support portion and the first detection element, the first connect portion width is a width of the first connect portion in a direction crossing the first connect portion path, the first connect portion thickness is a thickness of the first connect portion in the first direction, the second connect portion includes at least one of a second connect portion length different from the first connect portion length, a second connect portion width different from the first connect portion width, a second connect portion thickness different from the first connect portion thickness, or a second connect portion material different from the first connect portion material, the second connect portion length is a length of the second connect portion along a second connect portion path between the second support portion and the second detection element, the second connect portion width is a width of the second connect portion in a direction crossing the second connect portion path, and the second connect portion thickness is a thickness of the second connect portion in the first direction.

9. The sensor according to claim 8, wherein the second connect portion includes at least one of the second connect portion length shorter than the first connect portion length, the second connect portion width greater than the first connect portion width, the second connect portion thickness thicker than the first connect portion thickness.

10. The sensor according to claim 8, wherein a thermal conductivity of the second connect portion material is higher than a thermal conductivity of the first connect portion material.

11. The sensor according to claim 1, further comprising a third detection unit, the base further including a third base region, the third detection unit including a third detection element, the third detection element including a third resistance member, a third conductive member, and a third insulating member, at least a part of the third insulating member being between the third resistance member and the third conductive member, a third gap being provided between the third base region and the third detection element, the third detection element having a third area in the plane, the third area being different from the first area and different from the second area.

12. The sensor according to claim 1, further comprising a controller configured to be electrically connected with the first resistance member, the first conductive member, the second resistance member, and the second conductive member, the controller being configured to perform a first operation, in the first operation, the controller supplies a first current to the first conductive member to raise the temperature of the first detection element, in the first operation, the controller supplies a second current to the second conductive member to raise the temperature of the second detection element, in the first operation, the controller derives a first value corresponding to a first electric resistance of the first resistance member, in the first operation, the controller derives a second value corresponding to a second electric resistance of the second resistance member, in the first operation, the controller being configured to output a detection signal including a first detection value and a second detection value based on the first value and the second value, the first detection value corresponding to a concentration of a first substance included in a space around the first detection element and the second detection element, the second detection value corresponding to a concentration of a second substance included in the space.

13. The sensor according to claim 12, wherein the controller is configured to derive the first detected value and the second detected value based on a first information and a second information, the first information relates to a relationship between a concentration of the first substance and the first value for the first detection element, and a relationship between a concentration of the second substance and the first value for the first detection element, and the second information relates to a relationship between a concentration of the first substance and the second value for the second detection element, and a relationship between a concentration of the second substance and the second value for second detection element.

14. The sensor according to claim 12, wherein the controller includes a storage and a processor, the storage is configured to store the first information and the second information, and the processor is configured to read the first information and the second information from the storage unit, and is configured to output a detection signal including the first detection value and the second detection value based on the first information being read, the second information being read, the first value and the second value.

15. The sensor according to claim 12, further comprising a resistance element provided at the base,
the controller unit including a differential circuit,
the differential circuit being configured to derive the first value based on a difference between a potential corresponding to an electric resistance of the resistance element and a potential corresponding to the first electric resistance of the first resistance member, and
the differential circuit being configured to derive the second value based on a difference between a potential corresponding to the electric resistance of the resistance element and a potential corresponding to the second electric resistance of the second resistance member.

16. The sensor according to claim 12, wherein
the space further includes a third substance, and
the third substance includes at least one selected from the group consisting of nitrogen, air, carbon monoxide, and oxygen.

17. The sensor according to claim 12, wherein
the first substance includes one selected from the group consisting of carbon dioxide, helium, methane, chlorine, sulfur hexafluoride and hydrogen, and
the second substance includes another one selected from the group consisting of carbon dioxide, helium, methane, chlorine, sulfur hexafluoride and hydrogen.

* * * * *